United States Patent [19]

Andow et al.

[11] Patent Number: 4,511,981

[45] Date of Patent: Apr. 16, 1985

[54] PROTECTIVE RELAYING SYSTEM

[75] Inventors: Fumio Andow, Hachiohji; Masuo Nakashima, Urawa, both of Japan

[73] Assignee: Tokyo Shibaura Denki Kabushiki Kaisha, Kawasaki, Japan

[21] Appl. No.: 428,327

[22] Filed: Sep. 29, 1982

[30] Foreign Application Priority Data

Sep. 29, 1981 [JP] Japan ................. 56-154142

[51] Int. Cl.³ .............. G06F 15/46; G01R 31/08
[52] U.S. Cl. ................................ 364/492; 361/80
[58] Field of Search ............... 364/492, 80; 361/79, 361/81

[56] References Cited

U.S. PATENT DOCUMENTS

| | | | |
|---|---|---|---|
| 3,723,864 | 3/1973 | Ricard | 361/80 X |
| 4,313,169 | 1/1982 | Takagi et al. | 361/80 X |
| 4,321,681 | 3/1982 | Sackin et al. | 364/492 |
| 4,335,437 | 6/1982 | Wilson et al. | 364/492 X |
| 4,371,908 | 2/1983 | Andow et al. | 364/492 X |
| 4,428,022 | 1/1984 | Engel et al. | 364/492 X |
| 4,455,612 | 6/1984 | Girgis et al. | 364/492 X |

Primary Examiner—Edward J. Wise
Attorney, Agent, or Firm—Oblon, Fisher, Spivak, McClelland & Maier

[57] ABSTRACT

A protective relaying system which detects a fault in an electric power system having a circuit breaker by using a current and a voltage of the electric power system. The protective relaying system includes input conversion unit adapted for connecting the electric power system to receive a first and a second input signals corresponding to the current and the voltage and for converting the magnitude and/or the phase of the first and second input signals to produce a first, a second and a third electrical quantities. The protective relaying system also includes comparing unit connected to receive the first, second and third electrical quantities, for comparing the first and second electrical quantities to produce a first logical state signal, and comparing the third and a fourth electrical quantities to produce a second logical state signal cyclically, and for producing a logical state signal including the first and second logical state signals cyclically. The protective relaying system further includes digital data processing unit connected to receive cyclically the logical state signal, for producing a first and a second serial logical state signals and for judging whether a phase-rotation sequence of the first and second serial logical state signals equals a predetermined sequence to produce a protection relay output signal. The protection relay output signal is used to trip the circuit breaker.

20 Claims, 30 Drawing Figures

PROTECTIVE RELAYING SYSTEM

BACKGROUND OF THE INVENTION

1. Field of the Invention

This invention relates generally to a protective relaying system and more particularly to a protective relaying system provided with a digital processing unit for a relay calculation unit.

2. Description of the Prior Art

Hitherto, protective relays have been classified, according to operation principle, into an electromechanical type relay, a static type relay, and a digital type relay.

The electromechanical type relay drives a movable portion by means of flux of magnetic force or electromagnetic force, and opens and closes output contacts by movement of the movable portion.

The static type relay comprises a transistor circuit wherein comparisons of electrical quantities with one another in terms of magnitude and phases thereof are made, and produces an output in accordance with the thus compared result.

The digital type relay has such functions as to sample, with certain specified intervals, electrical quantities indicative of voltages and currents derived from respective phases of a power system to be protected, to hold the respective sampled values, to sequentially rearrange the same by means of a multiplexer, to convert the rearranged electrical quantities into digital quantities by utilizing an analog-to-digital converter, and to process these digital quantities within a digital processing unit on the basis of a predetermined relay calculation programs.

The static type relay, most commonly used of the three, will be described with reference to the accompanying drawings.

FIG. 1 is a diagram of principle structure illustrating a static-type mho characteristic distance relay (hereinafter, simply called a mho relay) in a single phase. In FIG. 1, a potential transformer PT and a current transformer CT installed at the terminal of a transmission line TL to be protected transform a voltage and a current of the transmission line TL, and respectively output a voltage $\dot{V}$ and a current $\dot{I}$ in the secondary thereof. Here, $\dot{V}$ and $\dot{I}$ indicate a voltage vector and a current vector, respectively. The voltage $\dot{V}$ and the current $\dot{I}$ are respectively inputted to an input conversion unit 100, wherein the inputted electrical quantities are converted into various electrical quantities such as $\dot{I}\dot{Z}$, $\dot{V}_p$ and $\dot{V}$ required for mho relay calculation, and outputted to a relay-operation judging unit 200.

A vector synthesizing circuit AD in the input conversion unit 100 multiplys the inputted current $\dot{I}$ by a simulated impedance $\dot{Z}$ which simulates the line impedance of the transmission line TL so as to output an electrical quantity $\dot{I}\dot{Z}$. Here, the phase of the electrical quantity $\dot{I}\dot{Z}$ leads the phase of the current $\dot{I}$ by a line impedance angle (an angle $<\dot{Z}$). ME represents a storage circuit which receives the voltage $\dot{V}$ and outputs an electrical quantity $\dot{V}_p$ as a polar quantity. The storage circuit ME, which is comprised of, for example, a series resonance circuit, produces the electrical quantity $\dot{V}_p$ of damped oscillation so that even in case that the input voltage abruptly becomes zero due to occurrence of extremely close fault, the system can maintain a proper direction judgment for a period of a few cycles.

Next, in the relay-operation judging unit 200, a comparator 1 receives the electrical quantity $\dot{I}\dot{Z}$ at the positive input terminal, and the electrical quantity $\dot{V}$, at the negative input terminal, respectively. The comparator 1 outputs a signal S1 of a logical state "1" when an instantaneous valve of $(\dot{I}\dot{Z}-\dot{V})$ is greater than zero, and when smaller than or equal to zero, then outputs the signal S1 of a logical state "0", respectively. A comparator 2 similarly receives the electrical quantity $\dot{V}_p$ at the positive input terminal, and a DC reference electrical quantity such as zero volts, at the negative input terminal, respectively. The DC reference electrical quantity is not necessarily limited to zero volts, and it may contain a certain amount of DC bias quantity so as to prevent misoperations of the relay-operation judging unit 200 when no signal is inputted thereto. The logical state output signals S1 and S2 from the comparators 1 and 2 are inputted to an AND circuit 3, wherein an overlapped angle $\theta$ (overlapped time) of the phases of the inputted signals is detected, and a logical state signal corresponding to the overlapped angle $\theta$ is outputted. A time-measuring circuit 4, which is comprised of an ON-delay timer, outputs a logical state "1" when the period during which the logical state signal "1" outputted from the AND circuit 3 remains is greater than a predetermined period, such as a period corresponding to an electrical angle of 90°. The logical state output "1" of the time-measuring circuit 4 indicates that the mho relay is operative, while "0", the mho relay is inoperative. The logical state output signal is used to trip a circuit breaker CB provided in the transmission lines TL.

FIG. 2 shows a characteristic diagram of the relay shown in FIG. 1, which indicates that when an angle $\theta$ defined by the electrical quantities $(\dot{I}\dot{Z}-\dot{V})$ and $\dot{V}_p$ is less than 90°, that is, when the head of $\dot{V}$ lies within the circular area, the relay is operated.

The foregoing description is made as to the mho relay provided with the phase detection unit of time-measuring type. Nextly, a mho relay with a phase detection unit of sequential circuit type will briefly be described. The sequential-circuit-type phase detection unit performs such that when a phase rotation sequence of inputted plural electrical quantities is detected by a logic circuit and thus detected phase rotation sequence accords with a predetermined phase sequence, the relay is to be operated. The judgment of phase sequence is generally made in accordance with the sequence in which the polarities of instantaneous value of inputted electrical quantities change. In case of a mho relay, for example, the phase of the output signal S1 of the comparator 1 shown in FIG. 1 is delayed by an electrical angle of 90° by a phase shifter to produce a signal $\dot{W}S1$, where $\dot{W}$ designates a vector which delays the phase of an input electrical quantity by an electrical angle of 90°. Then the sequence of instants when the polarity of the signal $\dot{W}S1$ and that of the output signal S2 of the comparator 2 change is judged. This can judge the phase relationship between two electrical quantities WS1 and S2. Under normal condition of transmission lines, a polarity-change instant of the signal $\dot{W}S1$ leads that of the signal S2, however, should a fault occur on the transmission line, conversely, the latter leads the former. By utilizing this phenomenon, the mho relay of this type can judge whether there is a fault within the protective region. The diagram of principle structure of the sequential-circuit-type phase detector unit is so well-known that illustration thereof is omitted.

The foregoing description has been made for a single phase of the mho relay, however, for protection of a three-phase circuit, three relays of identical principle and rating should be utilized.

In the case of the mho relay, when an operative region is attempted to extend, a load impedance caused by tidal current can possibly penetrate the operative region of the relay.

In such case, an ohm-characteristic distance relay (hereinafter, simply called ohm relay) which functions as a blinder is utilized together with the mho relay so as to prevent the ultimate output from being produced in the relay system.

FIG. 3 shows a characteristic diagram of the ohm relay, which indicates that when an angle $\theta$ established by the electrical quantities $(\dot{I}Zr-\dot{V})$ and $\dot{I}Z_R$ is less than 90°, the relay is to be operated. Here, the principle structure diagram of the ohm relay is not shown, however, it is equal to that of the mho relay shown in FIG. 1 except that the comparators 1 and 2 receive the input electrical quantities $\dot{I}Zr$ and $\dot{I}Z_R$ instead of the input electrical quantities $\dot{I}Z$ and $\dot{V}_p$, respectively.

In a conventional static-type protective relay system, mho relays and ohm relays are individually constituted by separate circuits, and such relays are required to be installed on respective phases, thus, the system have become inevitably bulky in scale, and also involved in disadvantages such as inefficient maintenance, inspections and cost thereof.

SUMMARY OF THE INVENTION

Accordingly, the first object of this invention is to provide a protective relaying system of smaller in system scale by commonly using hardwares of plural protective relay components which are identical or similar in fundamental structure principle.

The second object of this invention is to provide a protective relaying system provided with such functions of plural distance relay components as to judge, by utilizing electrical quantities indicative of voltages and currents derived from an electric power system to be protected, whether the calculated electrical quantities reside within a specified protective region.

The third object of this invention is to provide a protective relaying system which processes on the basis of simplified digital procedures derived from analog calculations on plural electrical quantities required for a plurality of distance relay components. These and other objects of this invention are achieved by a protective relaying system which detects a fault in an electric power system having a circuit breaker by using a current and a voltage of the electric power system and causes the circuit breaker to trip in accordance with the fault detection so as to protect the electric power system. The protective relaying system includes input conversion unit adapted for connecting the electric power system to receive a first and a second input signal corresponding to the current and the voltage and for converting the magnitude and/or the phase of the first and second input signals to produce a plurality of electrical quantities including a first, a second and a third electrical quantities. The protective relaying system also includes comparing unit connected to receive the first, second and third electrical quantities, for comparing the first electrical quantity with the second electrical quantity to produce a first logical state signal based on a first comparing result and comparing the third electrical quantity with a fourth electrical quantity to produce a second logical state signal based on a second comparing result cyclically, and for producing a logical state signal including the first and second logical state signals cyclically. The protective relaying system further includes digital data processing unit connected to receive cyclically the logical state signal, for producing a first and a second serial logical state signals based on the cyclically received first and second logical state signals, respectively, and for judging whether a phase-rotation sequence of the first and second serial logical state signals equals a predetermined sequence to produce a protection relay output signal based on the judging result. The protection relay output signal is adapted for using to trip the circuit breaker.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DESCRIPTION OF THE PREFERRED EMBODIMENTS

Figure 4:
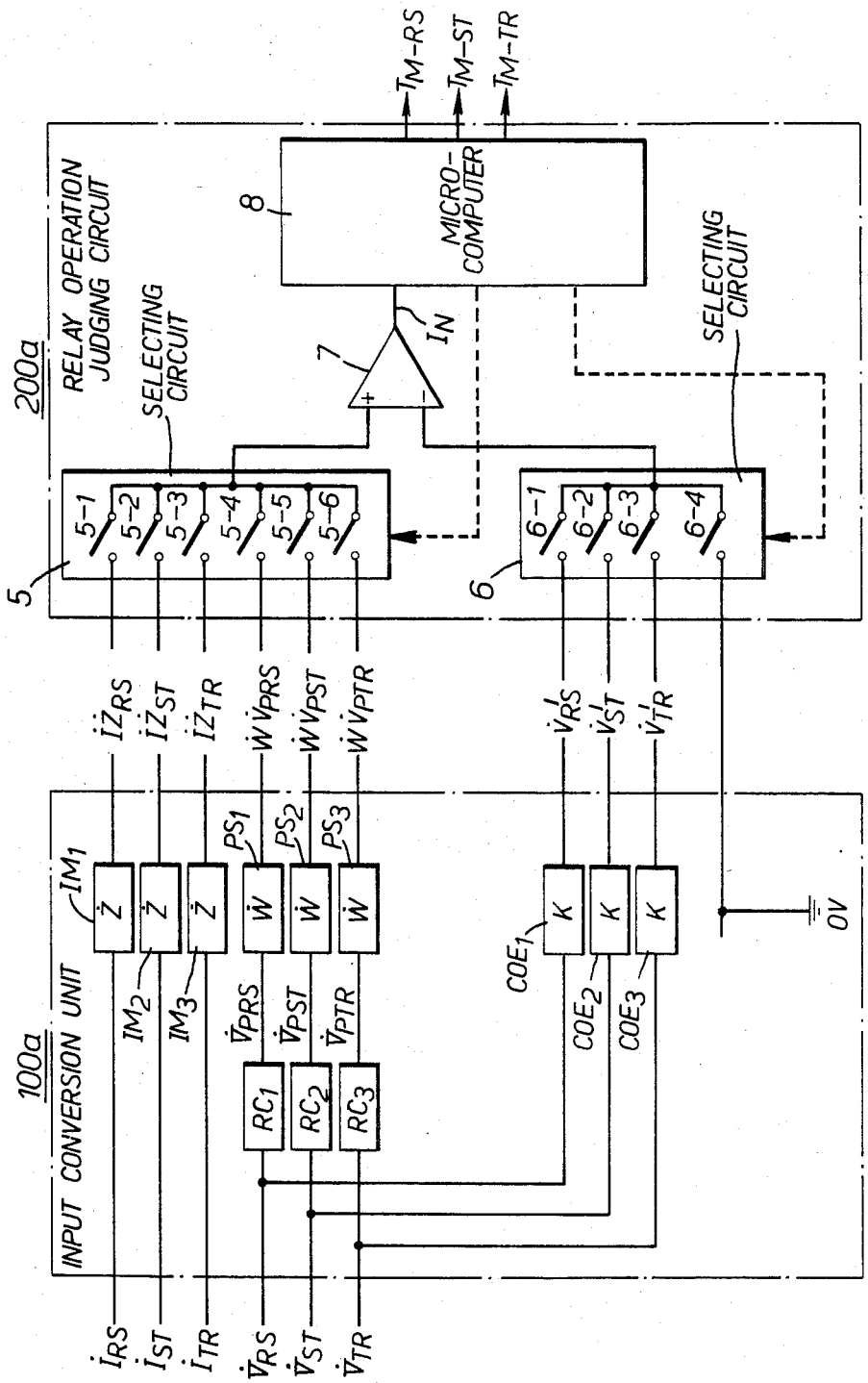
FIG. 4 is a block diagram of an embodiment according to the present invention.

Referring now to the drawings, wherein like reference numerals designate identical or corresponding parts throughout the several views, and more particularly to FIG. 4 thereof, there is shown a block diagram of an embodiment of a protective relaying system according to the present invention. This embodiment is of a sequential circuit type in phase-detection principle and is provided with functions of mho-characteristic short circuit distance relays corresponding to three phase transmission lines. In FIG. 4, 100a designates an input conversion unit. $I_{RS}$, $I_{ST}$ and $I_{TR}$ are difference currents of respective phase currents $(I_R\text{-}I_S)$, $(I_S\text{-}I_T)$ and $(I_T\text{-}I_R)$, respectively, where $I_R$, $I_S$ and $I_T$ are line currents of R-, S- and T-phase transmission lines detected by current transformers (not shown), respectively. These electrical quantities $I_{RS}$, $I_{ST}$ and $I_{TR}$ applied to simulated impedance circuits $I_{M1}$, $I_{M2}$ and $I_{M3}$ of the input conversion circuit 100a, respectively. The function of each of the simulated impedance circuits $I_{M1}$, $I_{M2}$ and $I_{M3}$ is the same as that of the vector synthesizing circuit AD shown in FIG. 1. The simulated impedance circuits $I_{M1}$, $I_{M2}$ and $I_{M3}$ output electrical quantities $IZ_{RS}$, $IZ_{ST}$ and $IZ_{TR}$, respectively. Line voltages $\dot V_{RS}$, $V_{ST}$ and $V_{TR}$ of the transmission line (not shown) are applied to the input conversion unit 100a. The electrical quantities $\dot V_{RS}$, $\dot V_{ST}$ and $\dot V_{TR}$ are applied in the input conversion unit 100a to resonance circuits RC1, RC2 and RC3, each having the same function as that of the storage circuit ME shown in FIG. 1. The resonance circuits RC1, RC2 and RC3 output polar voltage $\dot V_{PRS}$, $\dot V_{PST}$ and $V_{PTR}$, respectively, which are applied to phase shifter PS1, PS2 and PS3, respectively. The phase shifter PS1, PS2 and PS3 output electrical quantities $\dot W\dot V_{PRS}$, $\dot W V_{PST}$ and $\dot W\dot V_{PTR}$ which lag behind the inputted electrical quantities $V_{PRS}$, $\dot V_{PST}$ and $\dot V_{PTR}$, respectively, by an electrical angle of 90°, as is described in the prior art. The electrical quantities $V_{RS}$, $\dot V_{ST}$ and $\dot V_{TR}$ are also applied in the input conversion unit 100a to coefficient multipliers COE1, COE2 and COE3, respectively. The coefficient multipliers COE1, COE2 and COE3 multiply the inputted electrical quantities $\dot V_{RS}$, $V_{ST}$ and $\dot V_{TR}$ by a constant K (where K<1) to output electrical quantities $\dot V_{RS'}$, $\dot V_{ST'}$ and $\dot V_{TR}$, respectively. The input conversion unit 100a also output zero volt as a reference voltage. A relay operation judging unit 200a includes selecting circuits 5 and 6, comparator 7 and a digital processing unit 8. The selecting circuit 5 are provided with therein switching elements 5-1, 5-2, ..., and 5-6 corresponding to inputted electrical quantities $IZ_{RS}$, $IZ_{ST}$, $IZ_{TR}$, $WV_{PRS}$, $W\dot V_{PST}$ and $W\dot V_{PTR}$ outputted from the input conversion unit 100a. The selecting circuit 6 are provided with therein switching elements 6-1, 6-2, 6-3 and 6-4 corresponding to inputted electrical quantities $\dot V_{RS'}$, $V_{ST'}$ and $\dot V_{TR'}$ and zero volt outputted from the input conversion unit 100a. Each of the selecting circuits 5 and 6 is so controlled as to close the respective switching element thereof corresponding to a selecting signal outputted from the digital processing unit 8 thereby outputting the electrical quantity which has been applied on the respective switching element. As the switching elements 5-1, ..., 5-6 and 6-1, ..., 6-4, both mechanical switches and semiconductor switches such as field effect transistors can be used, as is obvious to those skilled in the art.

Figure 1:
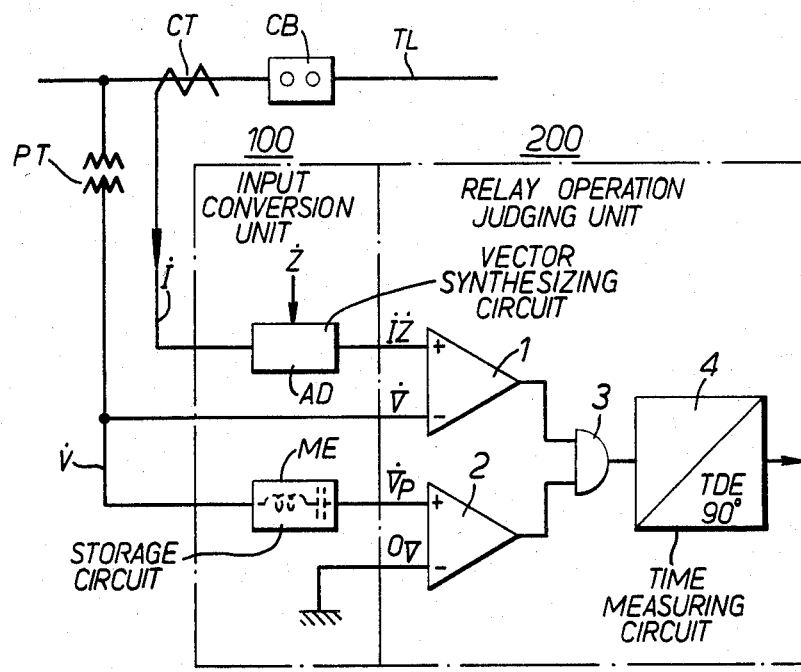
FIG. 1 is a block diagram illustrating the fundamentals of the structure of the prior art static-type mho relay.

The comparator 7, the same as the comparators 1 and 2 shown in FIG. 1, receives the electrical quantity outputted from the selecting circuit 5 at the positive input terminal and the electrical quantity outputted from the selecting circuit 6 at the negative input terminal. The comparator 7 compares two inputted electrical quantities and judges that which one is greater than the other, thereby outputting a logical state signal. The digital processing unit 8, constructed such as a microcomputer, controls the respective switching element of the selecting circuits 5 and 6 by applying selecting signals (shown in dotted line) periodically in predetermined sequence so as to periodically supply the predetermined electrical quantities to the input terminals of the comparator 7, and under this condition, receives the outputs thereof. The microcomputer 8 performs processing the received signals in digital procedure, and judges whether the relay is to be operated, thereby producing a protective output signal. This protective output signal is used to trip a circuit breaker (not shown) in the transmission line. Naturally, the above-described serial operations are excuted in accordance with the programs incorporated within the microcomputer 8. As described above, brief description of the present invention has been made, thus, hereinafter, detailed operation will be described by using actual electrical quantities. As shown in FIG. 4, the selecting circuit 5 receives input signals of electrical quantities such as $I\dot Z_{RS}$, $I\dot Z_{ST}$, $I\dot Z_{TR}$, $\dot W\dot V_{PRS}$, $\dot W\dot V_{PST}$ and $\dot W\dot V_{PTR}$. On the other hand, the selecting circuit 6 receives the zero volt as a reference potential and receives the electrical quantities $\dot V_{RS'}$, $\dot V_{ST'}$ and $\dot V_{TR'}$ which are proportional to respective line voltages $\dot V_{RS}$, $\dot V_{ST}$ and $\dot V_{TR}$. $T_{M\text{-}RS}$, $T_{M\text{-}ST}$ and $T_{M\text{-}TR}$ are protective output signals of respective phases.

Firstly, the method of protective calculation on R-S phase in which the microcomputer 8 reads logical state signals from the comparator 7 by controlling the selecting circuits 5 and 6 will be described. The microcomputer 8 applys a selecting signal to the switching element 5-4 of the selecting circuit 5 and simultaneously applys a selecting signal to the switching element 6-4 of the switching circuit 6. As a result, the switching element 5-4 is closed so that the electrical quantity $\dot W\dot V_{PRS}$ is selected, while at the same time the switching element 6-4 is closed so that zero volt is selected. This allows the electrical quantity $W\dot V_{PRS}$ and zero volt to be inputted to the comparator 7, and the output thereof becomes a logical state "1" when (instantaneous value of $\dot W\dot V_{PRS}$)>OV, and when (instantaneous value of $WV_{PRS}$)≦0, then reversely becomes a logical state "0". The logic output signal at such instant is temporarily defined as $A_{RS}(1)$. The microcomputer 8 reads this output signal $A_{RS}(1)$. Similarly, in turn, the microcomputer 8 applys a selecting signal to the selecting circuit 5 to cause the switching element 5-1 thereof to be closed so that the electrical quantity $IZ_{RS}$ is selected, while at the same time, applys a selecting signal to the switching element 6-1 of the selecting circuit 6 so as to select the electrical quantitys $\dot V_{RS'}$. This allows the electrical quantities $I\dot Z_{RS}$ and $\dot V_{RS'}$ to be inputted to the comparator 7, and the output thereof becomes a logical state "1" when (instantaneous value of $I\dot{Z}_{RS}$) > (instantaneous value of $\dot{V}_{R\acute{S}}$),
and when (instantaneous value of $I\dot{Z}_{R\acute{S}}$) ≤ (instantaneous value of $\dot{V}_{RS}$), then becomes a logical state "0". The logic output signal at such instant is temporarily defined as $B_{RS}(1)$. The microcomputer 8 reads this output signal $B_{RS}(1)$. Similarly, output signals $A_{ST}(1)$, $B_{ST}(1)$, $A_{TR}(1)$ and $B_{TR}(1)$ are obtained sequentially from the comparator 7 on S-T phase and T-R phase $A_S$ described above, the microcomputer 8 reads sequentially the signals $A_{RS}(1)$, $B_{RS}(1)$, $A_{ST}(1)$, $B_{ST}(1)$, $A_{TR}(1)$ and $B_{TR}(1)$ from the comparator 7. Further repetitions of such controls are so arranged as to enable the microcomputer 8 to sequentially read respective signals such as $A_{RS}(2)$, $B_{RS}(2)$, $A_{ST}(2)$, $B_{ST}(2)$, $A_{TR}(2)$, $B_{TR}(2)$, $A_{RS}(3)$, $B_{RS}(3)$ .... Here, the numbers of (1), (2), (3) ..., represent the number of repetitions.

According to the present invention, these serial signals are respectively processed in digital procedure, and utilized to judge whether the relay is to be operated. In case that the frequency of the electric power system is 50 Hz, the processing is executed once every about 56 microseconds corresponding to an electrical angle of 1°.

Figure 2:
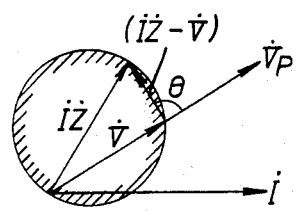
FIG. 2 is a characteristic diagram of mho relay.
Figure 3:
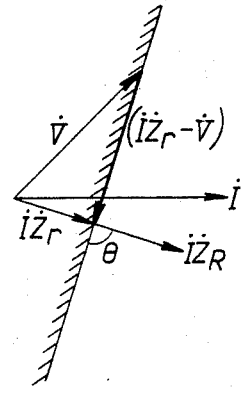
FIG. 3 is a characteristic diagram of the ohm relay.

As described above, the signal $A_{RS}(i)$ becomes a logical state "1" when (instantaneous value of $W\dot{V}_{PRS}$) > OV, and similarly the signal $B_{RS}(i)$ becomes a logical state "1" when
(instantaneous value of $I\dot{Z}_{RS}$) > (instantaneous value of $\dot{V}_{R\acute{S}}$), that is, when
(instantaneous value of ($I\dot{Z}_{RS}-\dot{V}_{RS}$)) > OV.
Therefore, by judging the sequence of an instant at which the signal $A_{RS}(i)$ changes from "0" to "1" and an instant at which the signal $B_{RS}(i)$ changes from "0" to "1", the microcomputer 8 can judge whether the phase angle created by the electrical quantities $W\dot{V}_{PRS}$ and ($I\dot{Z}_{RS}-\dot{V}_{R\acute{S}}$) lies in a predetermined relationship, that is, whether there is a fault within the protective region shown in FIG. 2. As will be seen in a later description, when an instant at which an instantaneous value of the electrical quantity $W\dot{V}_{RS}$ changes from "0" to "1" leads an instant at which an instantaneous value of the electrical quantity ($I\dot{Z}_{RS}-\dot{V}_{R\acute{S}}$) changes from "0" to "1", there is no fault within a protective region of mho relays.

Figure 5:
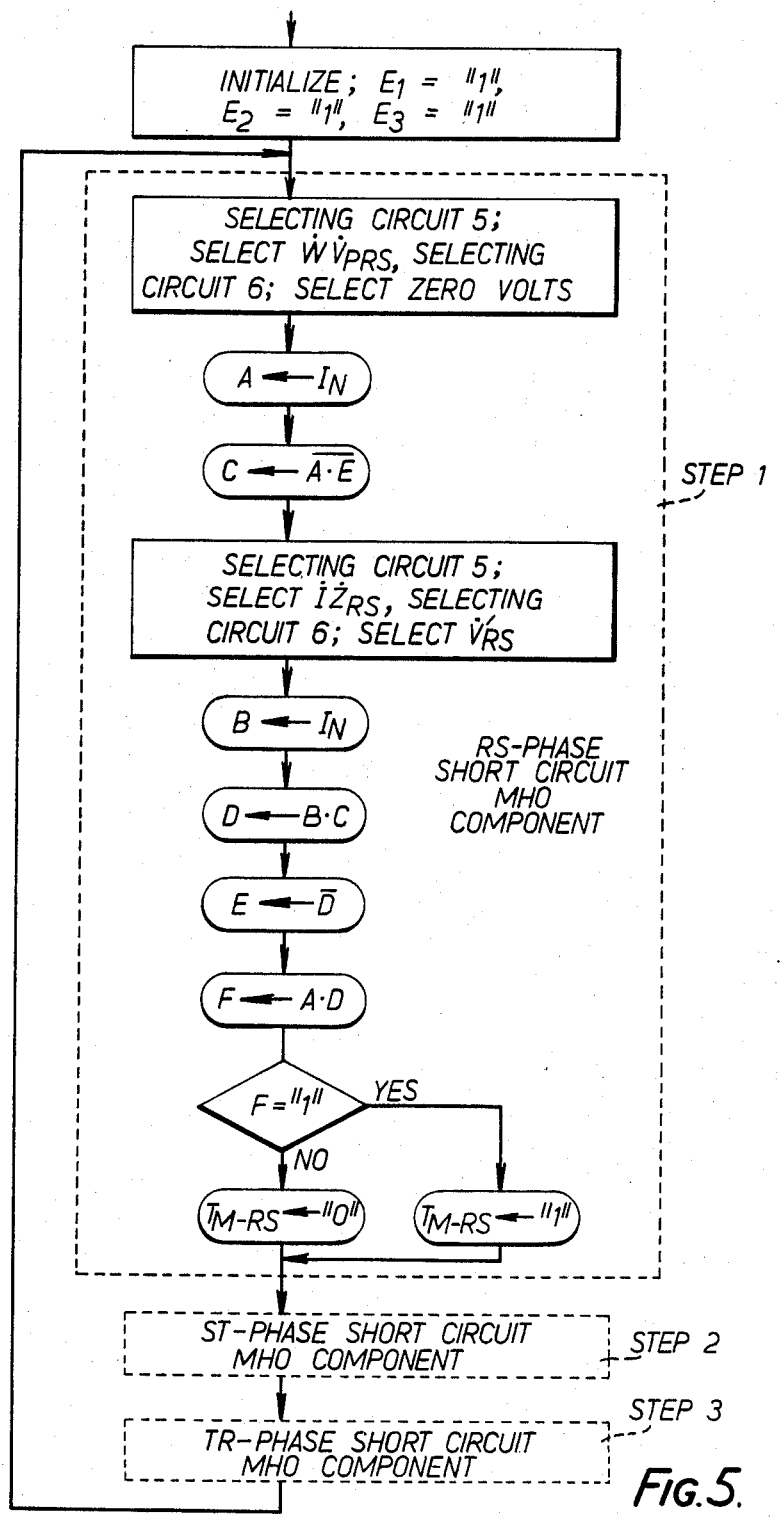
FIG. 5 is a flow chart illustrating the operations of the embodiment shown in FIG. 4.

Referring now to the flow chart shown in FIG. 5, the operation of microcomputer 8 will be described. Here, initialization of the microcomputer 8 and the like which are not directly relevant to the operation of relays are not described. In FIG. 5, Steps 1, 2 and 3 designate protective processing steps of RS-, ST- and TR- phase short circuit mho components, respectively. Registers E1, E2 and E3 are used exclusively in the steps 1, 2 and 3, respectively. On the other hand, registers A,B,C,D and F are used commonly in the steps 1, 2 and 3. First, the stored contents of the registers E1, E2 and E3 are initialized, that is set to be "1", respectively. The microcomputer 8 causes the selecting circuits 5 and 6 to select the electrical quantity $W\dot{V}_{PRS}$ and zero volt, respectively. The microcomputer 8 receives the signal $A_{RS}(i)$ which is obtained by such selecting procedure as a input signal $I_N$. The input signal $I_N$ is transferred to the register A in the microcomputer 8 (refer to FIG. 6, A). The inverse of logical product of stored contents of the registers A and E1, $\overline{A.E1}$ is obtained and transferred to the register C (refer to FIG. 6, C). Next, the microcomputer 8 causes the selecting circuits 5 and 6 to select the electrical quantities $I\dot{Z}_{RS}$ and $\dot{V}_{R\acute{S}}$, respectively. The microcomputer 8 receives the signal $B_{RS}(i)$ which is obtained by such selecting procedure as the input signal $I_N$. The input signal $I_N$ is transferred to the register B in the microcomputer 8 (refer to FIG. 6, B). The logical product of the stored contents of the registers B and C, B.C is obtained, and transferred to a register D (refer to FIG. 6, D). The inverse of the stored content of the register D is transferred to the register E1 (refer to FIG. 6, E1). The logical product of the stored contents of the registers A and D, A.D is obtained, and the result is transferred to a register F (refer to FIG. 6, F). Then an output $T_{M-RS}$ becomes "1" when the stored content of the register F is "1", and when the stored content thereof is "0", the output $T_{M-RS}$ becomes "0".

As described above, the microcomputer 8 can judge the sequence in that which one of the stored contents of the registers A and B becomes "1" first from "0", the states they have in common.

Figure 6:
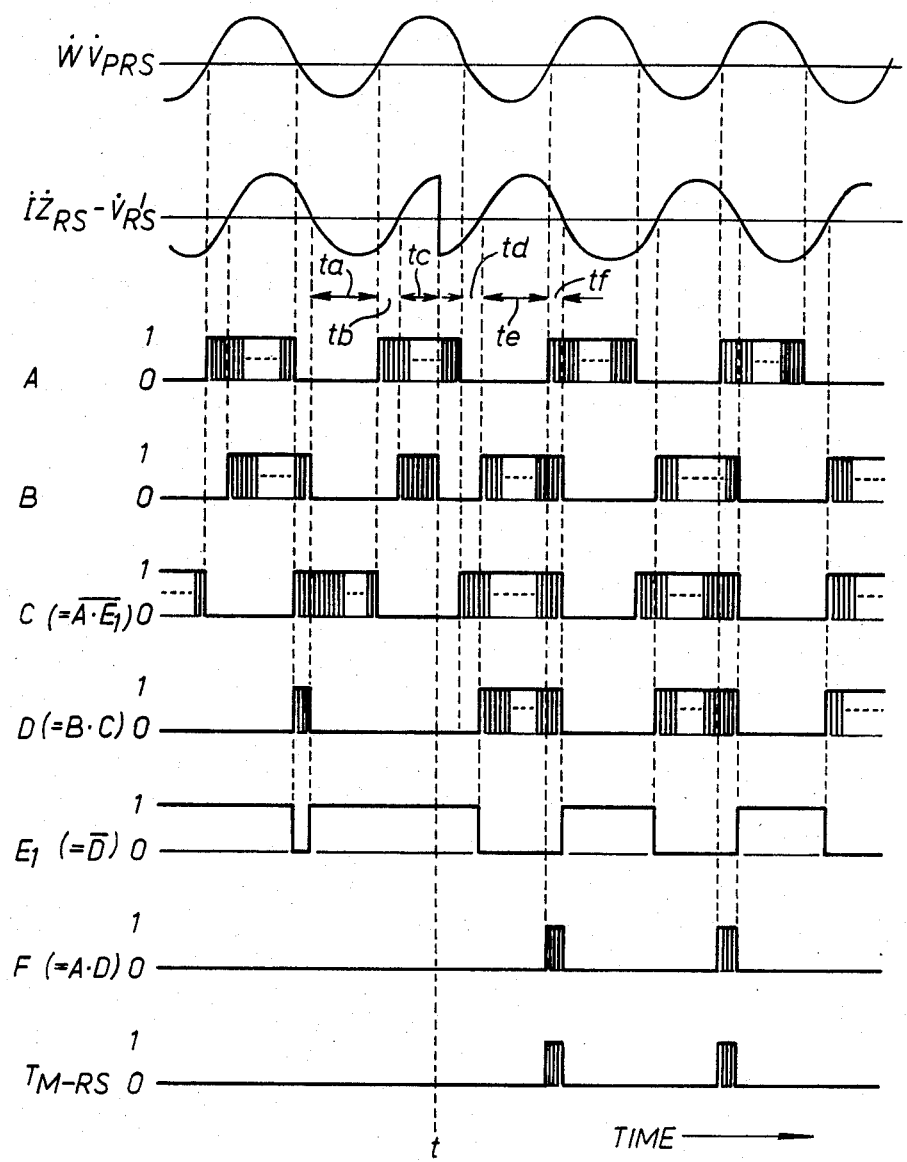
FIG. 6 is a time chart illustrating the operations of the embodiment shown in FIG. 4.

Nextly, the aforementioned operations will now be described in detail on the basis of the waveforms shown in the timechart of FIG. 6. In FIG. 6, the stored contents of the registers A, B, C, D, E1 and F and the output signal $T_{M-RS}$ are shown as rectangular waves, respectively. Exactly speaking, this is not correct, but the waveforms of the stored contents of the registers A and B are composed of the groups of many pulses having a very narrow pulse width corresponding to the signals $A_{RS}(i)$ and $B_{RS}(i)$ to be received by the microcomputer 8. The waveforms of the stored contents of the register C, D, E1 and F and of the output signal $T_{M-RS}$ are also composed of the groups of many pulses having a very narrow pulse width, respectively. Moreover, $W\dot{V}_{PRS}$ is an actual electrical quantity outputted from the input conversion unit 100a shown in FIG. 4, however, ($I\dot{Z}_{RS}-\dot{V}_{R\acute{S}}$) is an imaginary electrical quantity which is not present in the circuit shown in FIG. 4. The electrical quantity ($I\dot{Z}_{RS}-\dot{V}_{R\acute{S}}$) is dared to be shown as a sinusoital wave for ease of understanding this invention.

In FIG. 6, t represents an instant at which a fault occurs on the transmission line TL. The electrical quantity $W\dot{V}_{PRS}$ leads the electrical quantity ($I\dot{Z}_{RS}-\dot{V}_{R\acute{S}}$) during the period prior to the instant t. When concentrating on the stored contents of the registers A and B, the following relationship therebetween can be understood.

|  | the period | | |
| --- | --- | --- | --- |
|  | ta | tb | tc |
| the stored content of the register A | 0 → | 1 → | 1 |
| the stored content of the register B | 0 → | 0 → | 1 |

Therefore, as can be seen from the timechart shown in FIG. 6, the output F is "0", thus the microcomputer 8 does not produce a protective output signal $T_{M-RS}$.

After the instant t when a fault occurred, the phase of the waveform of the electrical quantity is inversed. The season of this phenomenon is as follows: Before the fault the electrical quantity $I\dot{Z}_{RS}$ has the same phase as the electrical quantity $\dot{V}_{RS}$ and the value of the electrical quantity $I\dot{Z}_{R\acute{S}}$ is smaller than that of the electrical quantity $\dot{V}_{R\acute{S}}$. After the fault, two electrical quantities $I\dot{Z}_{RS}$ and $\dot{V}_{R\acute{S}}$ keep the same relationship in phase but the value of the electrical quantity $I\dot{Z}_{RS}$ becomes larger than that of the electrical quantity $\dot{V}_{R\acute{S}}$.

After the instant t, the electrical quantity $W\dot{V}_{PRS}$ lags behind the electrical quantity ($I\dot{Z}_{RS}-\dot{V}_{R\acute{S}}$), thus, when concentrating on the stored contents of the registers A and B, the following relationship therebetween can be understood

|  | the period | | |
| --- | --- | --- | --- |
|  | td | te | tf |
| the stored content of the register A | 0 | 0 | 1 |
| the stored content of the register B | 0 | 1 | 1 |

Therefore, in this case, the output F becomes "1".

This shows that the electrical quantity $(\dot{IZ}_{RS}-\dot{V}_{RS})$, that is, $B_{RS}(i)$ operates within the region of leading the electrical quantity $\dot{WV}_{PRS}$, that is, $A_{RS}(i)$ by 0° to 180°.

However, $\dot{WV}_{PRS}$ is the electrical quantity which lags behind the electrical quantity $\dot{V}_{PRS}$ by 90°, thus this results in that the electrical quantity $(\dot{IZ}_{PS}-\dot{V}_{RS})$ operates within ±90° with respect to the electrical quantity $\dot{V}_{PRS}$. This becomes identical to that the electrical quantity $(\dot{IZ}-\dot{V})$ operates in accordance with the conventional detection principle of mho characteristics, i.e. to that the electrical quantity $(\dot{IZ}-\dot{V})$ operates within 90° with respect ot the electrical quantity $\dot{V}_P$.

STEP 2 and STEP 3 shown in FIG. 5 are respectively identical to STEP 1 except that electrical quantities on R-S phase are substituted by those on S-T phase and T-R phase, respectively, and that the register E1 is substituted by the register E2 and E3 respectively, thus the operations thereof are identical to STEP 1. The microcomputer 8 repeatedly executes the procedures of STEP 1, STEP 2 and STEP 3.

The protective output signals $T_{M-RS}$, $T_{M-ST}$ and $T_{M-TR}$ are applied to trip circuits of the R- and S- phase circuit breakers, S- and T- phase circuit breakers and T- and R- phase circuit breakers (not shown in FIG. 4), respectively and also are applied to a fault indicating circuit (not shown).

Figure 7A:
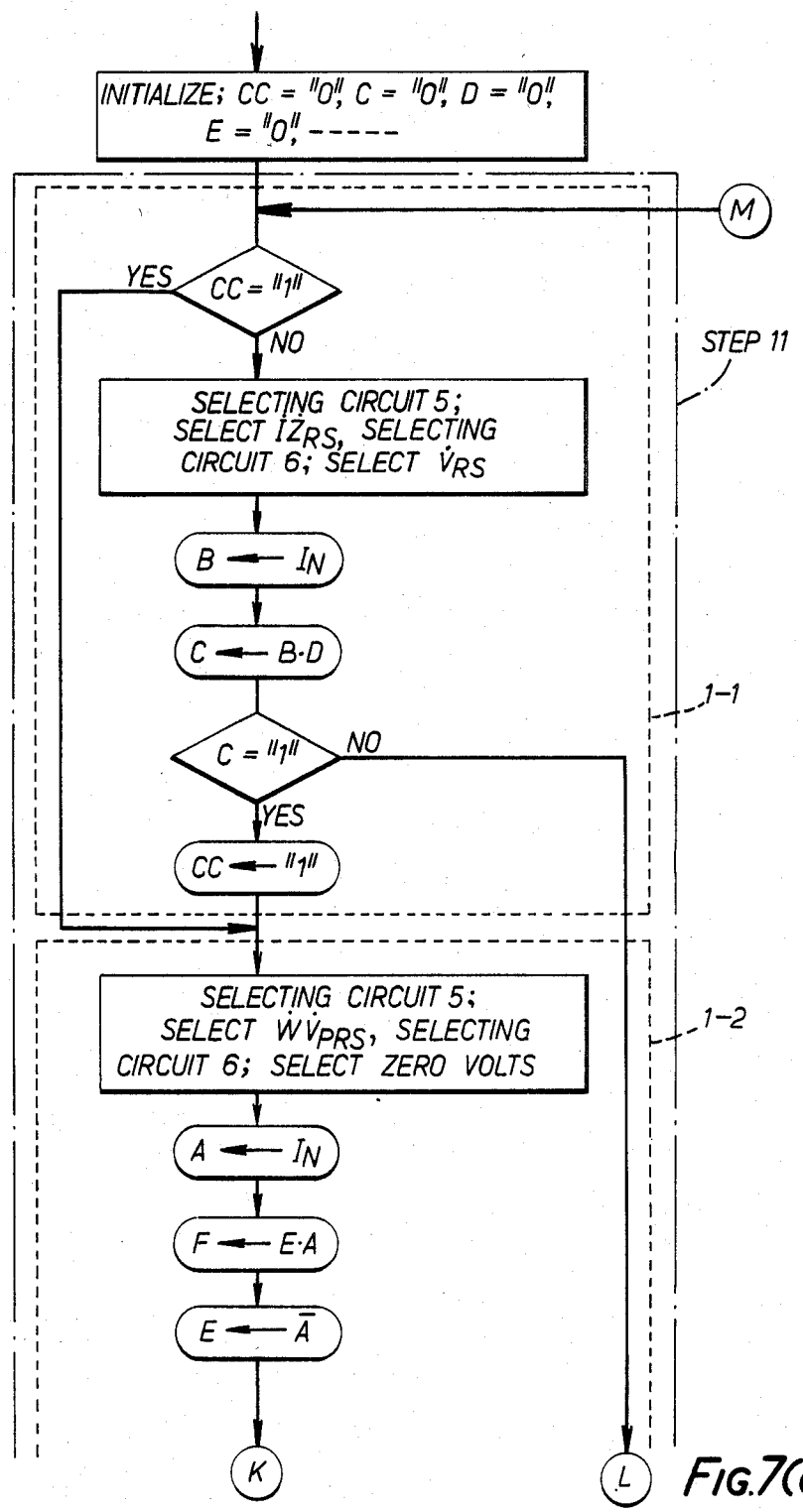
FIGS. 7(a) and 7(b) are flow charts illustrating the operations of other embodiments.
Figure 8:
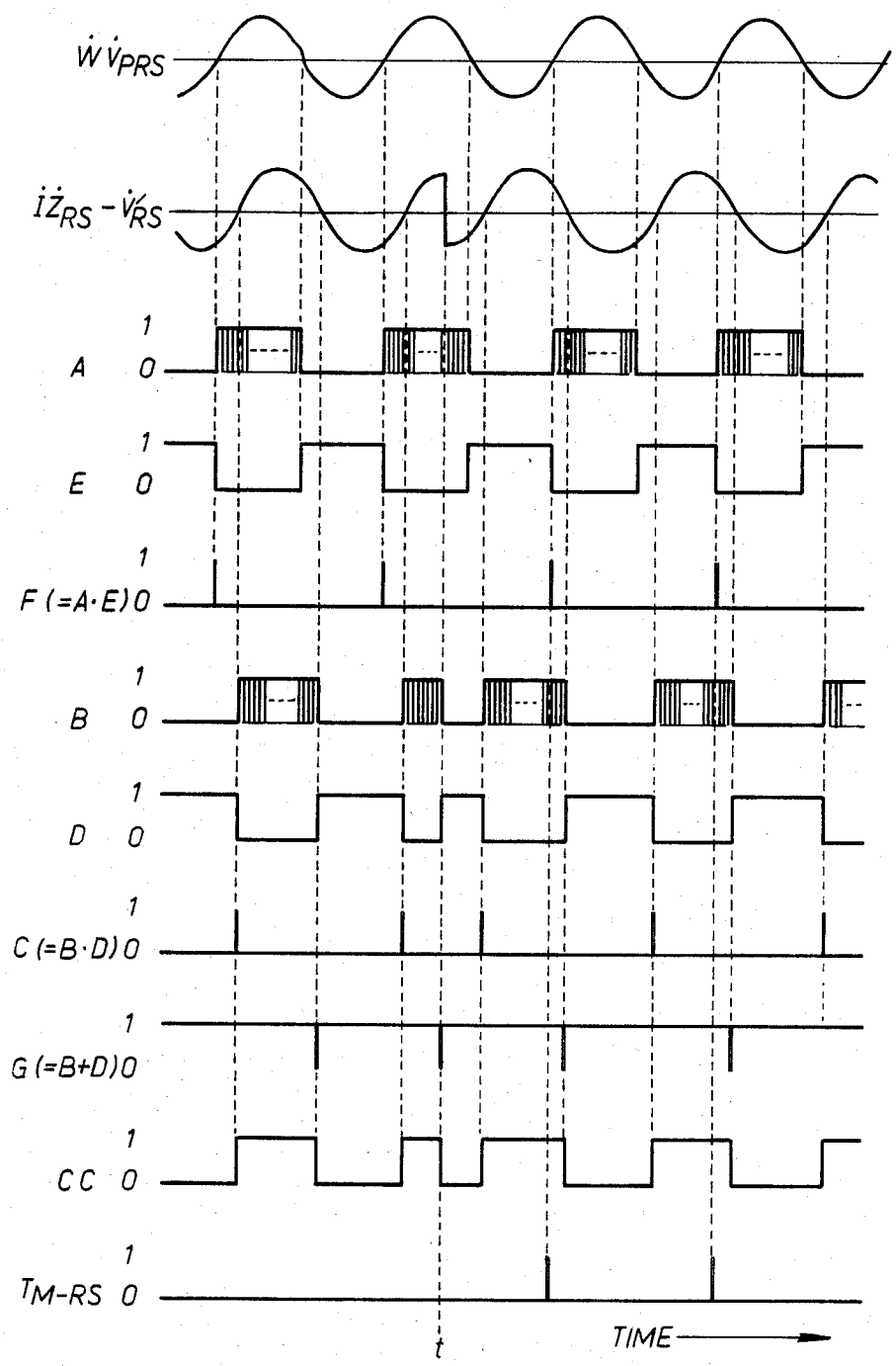
FIG. 8 is a time chart illustrating the operations of other embodiments.

FIGS. 7(a) and 8(b) show flowcharts of other program of a microcomputer according to another embodiment of this invention. The circuit construction of this embodiment is as same as that shown in FIG. 4, so that it is not shown to avoid duplication. The embodiment will be explained together with a flowchart shown in FIG. 8. Here, initialization of the microcomputer 8 and the like which are not directly relevant to judging whether the relay is to be operated are not described.

Figure 7B:
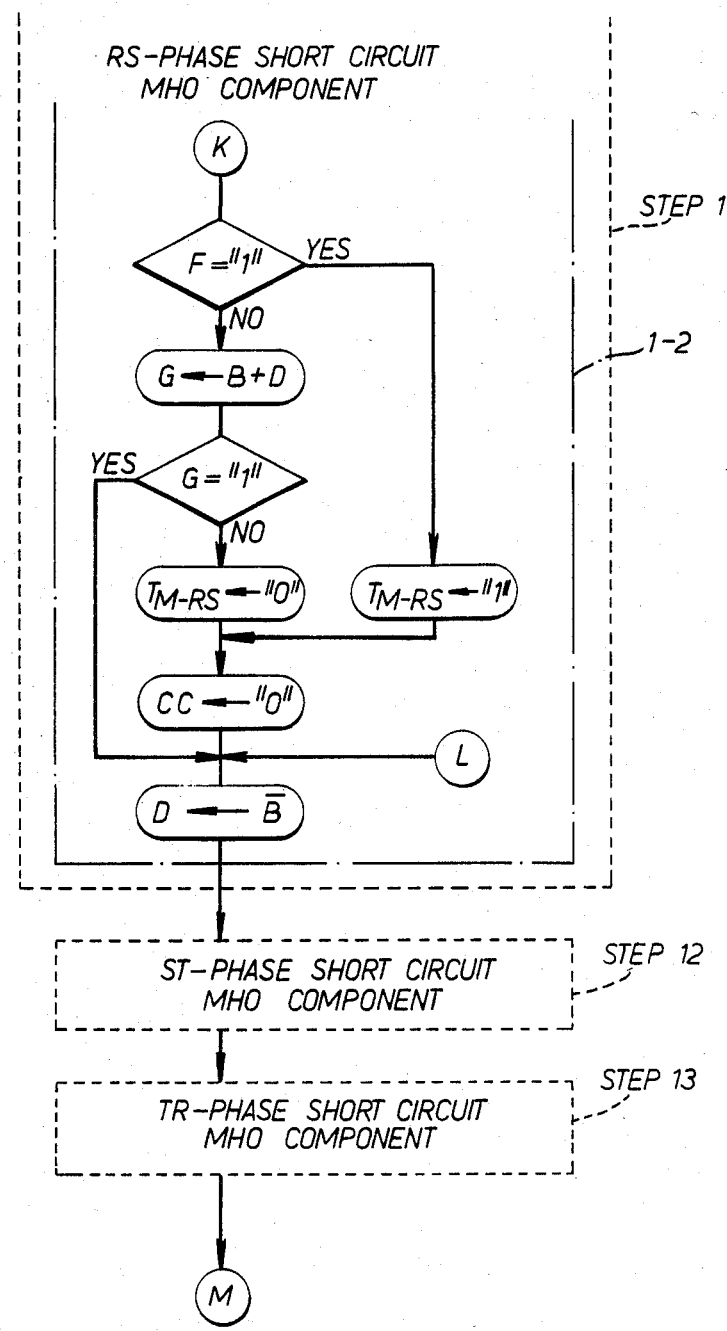

In FIG. 7(a), the procedure firstly initializes registers CC, C, D and E. When the stored content of the register CC is "1" in a step 1—1 of a step 11, the procedure advances to a step 1—2, and when it is "0" the procedure executes the following operation within the step 1—1. The microcomputer 8 causes the selecting circuits 5 and 6 to select the electrical quantities $\dot{IZ}_{RS}$ and $\dot{V}_{RS}$ and receives the signal $B_{RS}(i)$ as the input signal $I_N$. The input signal $I_N$ is then transferred to a register B (refer to FIG. 8, $\dot{IZ}_{RS}-\dot{V}_{RS}$ and B). Nextly, the logical product of the stored contents of registers B and D, B.D, is obtained, and the result is transferred to the register C (in this case, the stored content of the register D is represented as $\bar{B}$, the inverse of the stored content of the register B). When the stored content of the register C is in "1" state, the procedure causes the register CC to be "1", and advances to 1-2 step. When the stored content of the register C is in "0" state, the procedure advances to STEP 12 (S-T phase shortcircuit mho component) after the inverse of the stored content of the register B is transferred to the register D. This indicates that, in FIG. 7(a), when C is not in "1" state in the 1—1 step, $\bar{B}$, the inverse of the stored content of the register B, is transferred, through L terminal of FIG. 7(a) and 7(b), to the register D. (refer to FIG. 8, D). On the other hand, in 1-2 step, the microcomputer 8 causes the selecting circuits 5 and 6 to select the electrical quantity $\dot{WV}_{PRS}$ and zero volt, respectively, and receives $A_{RS}(i)$ derived from the comparator 7 as the input signal $I_N$. The input signal $I_N$ is transferred to the register A (refer to FIG. 8, $\dot{WV}_{PRS}$ and A). Next, a logical product of the stored contents of the registers A and E, A.E is obtained, and the result is transferred to the register F. Nextly, the inverse of the stored content of the register A is transferred to the register E. When the stored content of register F is in "1" state, the procedure causes the output $T_{M-RS}$ to be "1" and the stored content of the register CC to be "0", and also advances to STEP 12 after the inverse of the stored content of register B is transferred to the register D. When the stored content of register F is "0", a logical sum of the stored contents of registers B and D is obtained, and the result is transferred to a register G (refer to FIG. 8, G). When the stored content of the register G is "1", the procedure advances to STEP 12 after the inverse of the stored content of register B is transferred to the register D. Whereas the stored content of register G is "0", the procedure causes the output $T_{M-RS}$ to be "0", the stored content of the register CC to be "0", respectively and advances to STEP 12 after the inverse of the stored content of register B is transferred to the register D.

The point is that the procedure, in the 1—1 step, locates an instant at which B changes from "0" to "1" by utilizing C=1, and in the 1-2 step, an instant at which B changes from "1" to "0" by utilizing G=1. Should A change from "0" to "1" and F become "1" during the period between the instant at which B changes from "0" to "1" and, in turn, the instant at which B changes from "1" to "0", the output $T_{M-RS}$ would become "1". The condition under which the output $T_{M-RS}$ becomes "1" is quite similar to that of the case shown in FIG. 5, so that the identical characteristics can be obtained. As described above, STEP 12 and STEP 13 are respectively identical to STEP 11 except for that electrical quantities on R-S phase are substituted by those on S-T phase and T-R phase, respectively. The microcomputer 8 repeatedly executes the procedures of STEP 11, STEP 12 and STEP 13.

As described above, according to the present invention, the relays which are identical in operation principle or in fundamental structures with respect to one another can be combined into a single relay which consists of simplified structure, thus reduction in system scale can be achieved.

Figure 9:
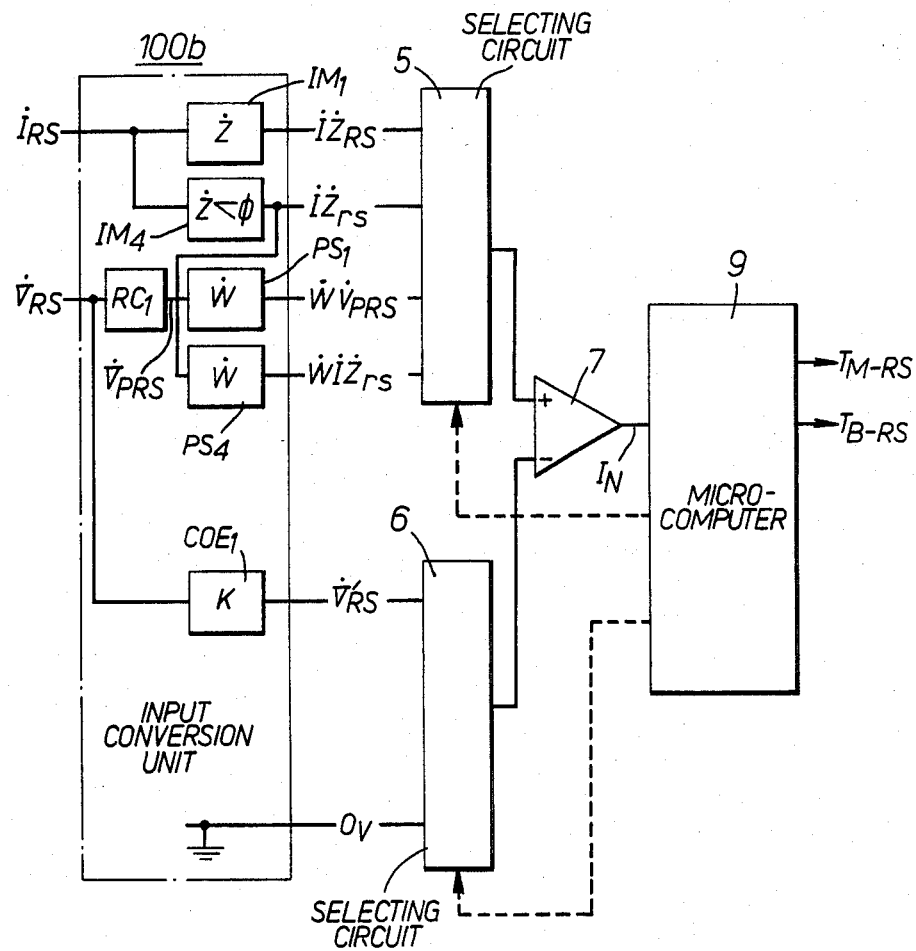
FIG. 9 is a block diagram of another embodiment according to the present invention.

FIG. 9 is a block diagram illustrating the structure of another embodiment according to the present invention which is provided with both mho- and ohm-characteristics. However, for case of explanation, only the input signals for R-S phase shortcircuit protection of the transmission line are described.

In FIG. 9, 100b designates an input conversion unit, to which a current $\dot{I}_{RS}$ and a voltage $\dot{V}_{RS}$ are applied. The current $\dot{I}_{RS}$ is applied to the simulated impedance circuit IM1 and an impedance circuit IM4 in the input conversion unit 100b. The simulated impedance circuit IM1 outputs the electrical quantity $\dot{IZ}_{RS}$. The impedance circuit IM4 outputs the electrical quantity $\dot{IZ}_{rS}$. The electrical quantity $\dot{IZ}_{rS}$ is applied to the phase shifter PS4, which delays the phase of the inputted electrical quantity $\dot{WIZ}_{rS}$. The voltage $\dot{V}_{RS}$ is applied to the resonance circuit RC1 and the coefficient multiplier COE1 in the input conversion unit 100b. The resonance circuit RC1 outputs the polar voltage $\dot{V}_{PRS}$, as described before in the circuit shown in FIG. 4, which is applied to the phase shifter PS1. The phase shifter PS1 produces the electrical quantity $\dot{W}\dot{V}_{PRS}$ which lags behind the inputted polar voltage $\dot{V}_{PRS}$ by 90°. The coefficient multiplier COE1 multiplies the inputted voltage $\dot{V}_{RS}$ by K (usually K<1) to produce the electrical quantity $\dot{V}_{RS}'$. The input conversion unit 100b also output zero volt as a reference voltage.

Reference numerals 5, 6 and 7 respectively correspond to those designated identical numeral shown in FIG. 4, and 9 designates a microcomputer. $T_{M-RS}$ represents the output of RS-phase mho relaying component and $T_{B-RS}$ represents the output of ohm relaying component which is called an RS-phase blinder, respectively. Input electrical quantities of the selecting circuit 5 are $\dot{I}\dot{Z}_{RS}$, $\dot{I}\dot{Z}_{rS}$, $\dot{W}\dot{V}_{PRS}$ and $\dot{W}\dot{I}\dot{Z}_{PrS}$, of which are outputted from the input conversion unit 100b. On the other hand, the input signals of the selecting circuit 6 are the electrical quantity $\dot{V}_{RS}'$ proportional to the line voltage $\dot{V}_{RS}$ and zero volt.

Figures 10A, 10B:
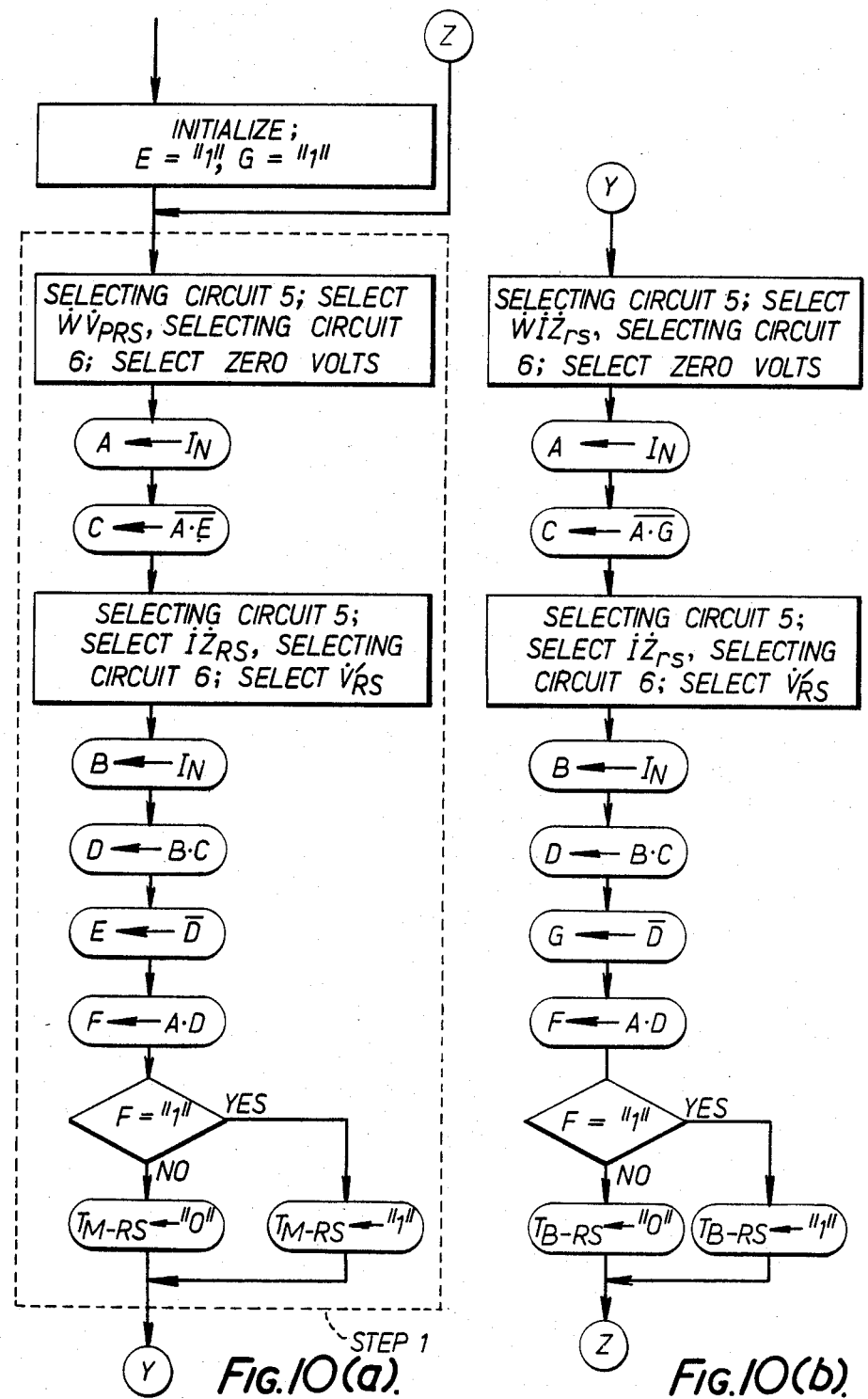
FIGS. 10(a) and 10(b) are flow charts illustrating the operations of the embodiment shown in FIG. 9.

The operations of the aforementioned system will be described with reference to FIGS. 10(a) and 10(b). FIG. 10(a) shows the operations of the mho relay component, and FIG. 10(b), the operations of the ohm relay component, respectively. The operation shown in FIG. 10(a) are identical to that of STEP 1 shown in FIG. 5, so that the explanation thereof is omitted. In FIG. 10(b), the microcomputer 9 causes, by applying selecting signals, the switching circuit 5 to select the electrical quantity $\dot{W}\dot{I}\dot{Z}_{PrS}$ and the selecting circuit 6 to select zero volt. The electrical quantity $\dot{W}\dot{I}\dot{Z}_{PrS}$ is inputted to the positive input terminal of the comparator 7, and zero volt, to the negative input terminal thereof, respectively. The comparator 7 outputs a logical state signal corresponding to the electrical quantity $\dot{W}\dot{I}\dot{Z}_{rS}$ which, in turn, is introduced to the microcomputer 9. In this case, the input signal $I_N$ becomes a logical state "1" when an instantaneous value of the electrical quantity $\dot{W}\dot{I}\dot{Z}_{rS}$ is positive, and when negative or zero, then becomes a logical state "0", and this signal $I_N$ is transferred to a register A. Next, the inverse of a logical product of the stored contents of registers A and G (G is equal to $\overline{D}$), $\overline{A \cdot G}$, is obtained, and the result is transferred to a register C. Nextly, the microcomputer 9 causes the selecting circuits 5 and 6 to select the electrical quantities $\dot{I}\dot{Z}_{rS}$ and $\dot{V}_{RS}'$, respectively, and receives the logical output signal of the comparator 7 as an input signal $I_N$ in the same manner as described above. In this case, the input signal $I_N$ becomes a logical state "1" when an instantaneous value of the electrical quantity $(\dot{I}\dot{Z}_{rS} - \dot{V}_{RS}')$ is positive, and when negative or zero, then becomes a logical state "0", and this input signal $I_N$ is transferred to a register B. Next, a logical product of the stored contents of registers B and C, B.C is obtained, and the result is transferred to a register D. The inverse of the stored content of register D is transferred to a register G. A logical product of the registers A and D, A.D is obtained, and the result is transferred to a register F. The output $T_{B-RS}$ becomes "1" when the stored content of the register F is "1", and when "0", then the output $T_{B-RS}$ becomes "0".

Figure 11:
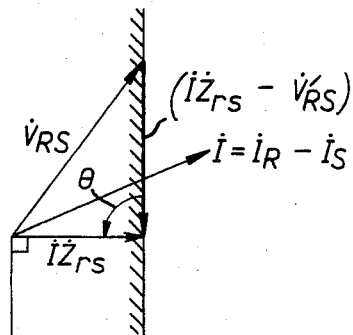
FIG. 11 is a characteristic diagram of the ohm relay of the embodiment shown in FIG. 9.

By virtue of the operations described above, when the phase angle $\theta$ defined by the electrical quantities $(\dot{I}\dot{Z} - \dot{V}_{RS})$ and $\dot{I}\dot{Z}_{PrS}$ is smaller than or equal to 90° ($\theta \leq 90°$), the ohm relay component operates, and the characteristics illustrated in FIG. 11 can be obtained.

Figure 12:
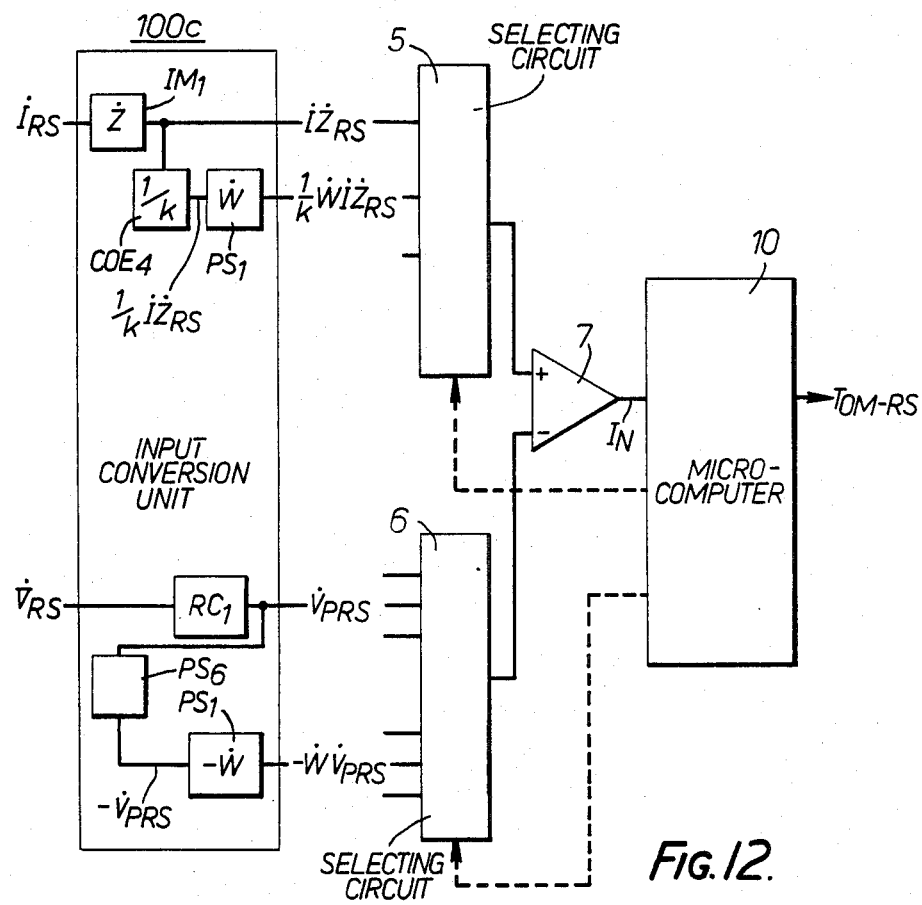
FIG. 12 is a block diagram of other embodiment according to the present invention.

FIG. 12 shows a diagram of another embodiment according to the invention, which is provided with an offset mho characteristics. In FIG. 12, an input conversion unit 100c receives a current $\dot{I}_{RS}$ and a voltage $\dot{V}_{RS}$ and produces electrical quantities ties $\dot{I}\dot{Z}_{RS}$, $(1/k) \dot{W}\dot{I}\dot{Z}_{RS}$, $\dot{V}_{PRS}$ and $(-\dot{W}\dot{V}_{PRS})$. The construction of the input conversion unit 100c will be explained in more detail. The current $\dot{I}_{RS}$ is applied to the simulated impedance circuit IM1, which produces the electrical quantity $\dot{I}\dot{Z}_{RS}$ as described before. The electrical quantity $\dot{I}\dot{Z}_{RS}$ is applied to the coefficient multiplier COE4 which multiplies the electrical quantity $\dot{I}\dot{Z}_{RS}$ by $(1/k)$ to produce an electrical quantity $(1/k) \dot{I}\dot{Z}_{RS}$. The phase shifter PS1 receives the electrical quantity $(1/k) \dot{I}\dot{Z}_{RS}$ and produces the electrical quantity $(1/k) \dot{W}\dot{I}\dot{Z}_{RS}$ by shifting the phase by 90°. The resonance circuit RC1 receives the voltage $\dot{V}_{RS}$ and produces the electrical quantity $\dot{V}_{PRS}$, as described before, a phase shifter PS6 receives the electrical quantity $\dot{V}_{PRS}$ and delays the phase of this electrical quantity $\dot{V}_{PRS}$ by 180° to produce an electric quantity $(-\dot{V}_{PRS})$. The phase shifter PS1 receives the electrical quantity $(-\dot{V}_{PRS})$ and delays the phase of this electrical quantity $(-\dot{V}_{PRS})$ by 90° to produce an electrical quantity $(-\dot{W}\dot{V}_{PRS})$.

In FIG. 12, reference numerals 5, 6 and 7 are respectively selecting circuits and the comparator corresponding to those designated identical reference numerals shown in FIG. 4, 10 designates a microcomputer, and $T_{OM-RS}$ represents the output of the offset mho relay. The input signals of the selecting circuit 5 are the electrical quantities $\dot{I}\dot{Z}_{RS}$ and $(1/k) \dot{W}\dot{I}\dot{Z}_{RS}$. On the other hand, the input signals of the selecting circuit 6 are the electrical quantities $\dot{V}_{PRS}$ and $(-\dot{W}\dot{V}_{PRS})$ which lags behind the electrical quantity $\dot{V}_{PRS}$ by 270°.

Figure 13:
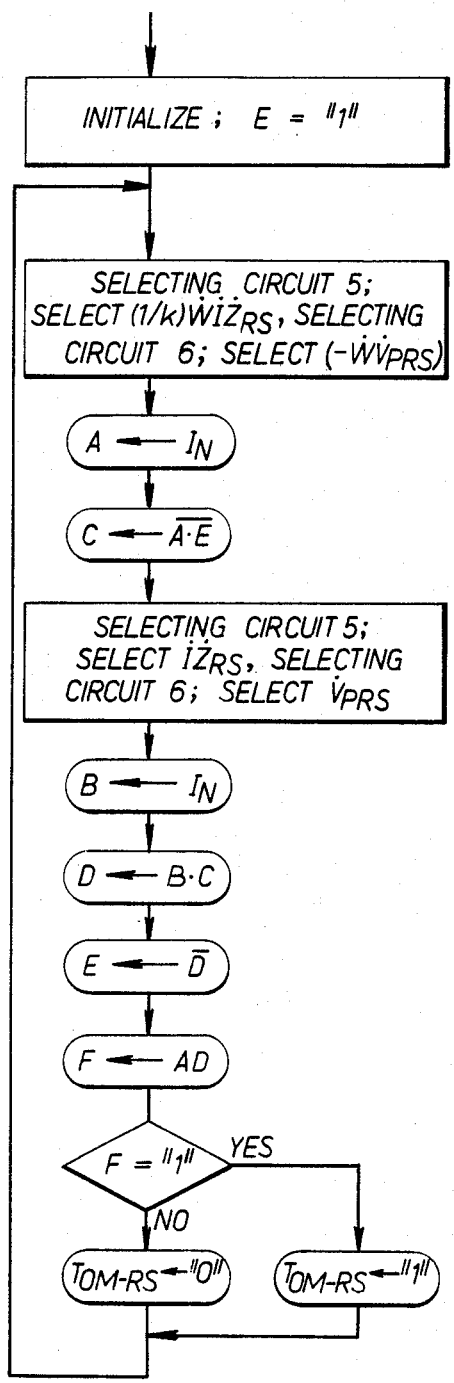
FIG. 13 is a flow chart illustrating the operations of the embodiment shown in FIG. 12.

The operations of the aforementioned system will be described with reference to FIG. 13. First, the microcomputer 10 causes the selecting circuits 5 and 6 to select the electrical quantities $(1/k) \dot{W}\dot{I}\dot{Z}_{RS}$ and $(-\dot{W}\dot{V}_{PRS})$, then, through the comparator 7 in which these signals are compared, reads the resultant logical signal output thereof as the input signal $I_N$. In this case, the input signal $I_N$ becomes a logical state "1" when an instantaneous value of the abovementioned input signal $(1/k \ \dot{W}\dot{I}\dot{Z}_{RS} + \dot{W}\dot{V}_{PRS})$ is positive, and when negative or zero, then becomes a logical state "0", and this signal is transferred to a register A. Next, the inverse of a logical product of the stored contents of registers A and E, $\overline{A \cdot E}$ is obtained, and the result is transferred to a register C.

Nextly, the microcomputer 10 causes the selecting circuits 5 and 6 to select the electrical quantities $\dot{I}\dot{Z}_{RS}$ and $\dot{V}_{PRS}$ by selecting signals, and receives the compared resultant output of the comparator 7 as a logical signal $B_{RS(i)}$. This input signal $B_{RS(i)}$ is transferred to a register B. Next, a logical product of the stored content of the registers B and C, B.C is obtained, and the result is transferred to a register D. Also the inverse of the content of the register D is transferred to a register E and a logical product of the stored content of the registers A and D, A.D is obtained, and the result is transferred to a register F.

Figure 14:
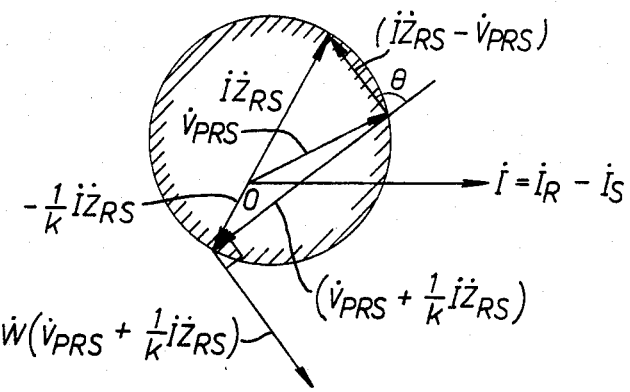
FIG. 14 is a characteristic diagram of the offset mho relay of the embodiment shown in FIG. 12.

As a result, the procedure causes an output $T_{OM-RS}$ to be "1" when the content of the register F is "1", and when in "0" state, then causes the output $T_{OM-RS}$ to be "0". As described above, the offset mho-characteristic distance relay shown in FIG. 14 is obtained as well as other reactance characteristics.

Figure 15:
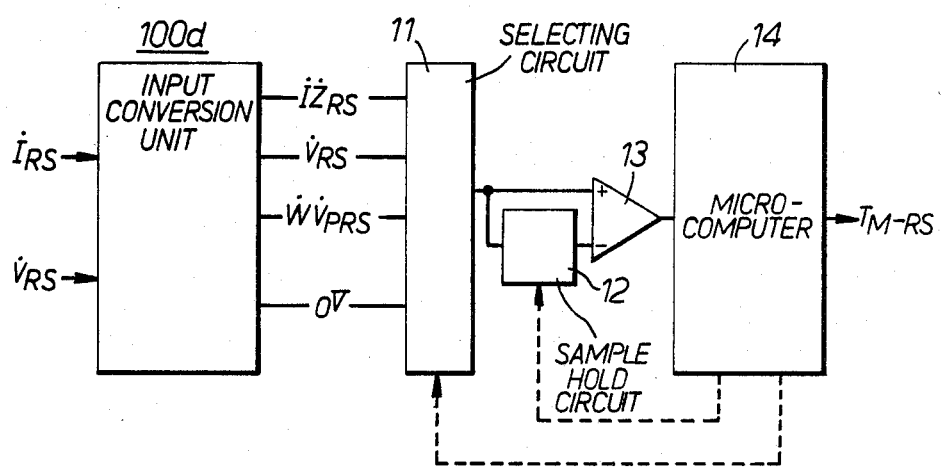
FIG. 15 is a block diagram of another embodiment according to the present invention.

FIG. 15 shows a block diagram of another embodiment according to the invention, wherein a short-circuit distance relay provided with mho characteristics is illustrated. In FIG. 15, an input conversion unit 100d receives a current $I_{RS}$ and a voltage $\dot{V}_{RS}$ and output RS-phase electrical quantities $I\dot{Z}_{RS}$, $\dot{V}_{RS}$ and $W\dot{V}_{PRS}$ and zero volt as a reference voltage. The input conversion unit 100d has the same construction as the input conversion unit 100a shown in FIG. 4 except that the input conversion unit 100d deals with only RS-phase electrical quantities, so that the detailed construction of the input conversion unit 100d is not shown in FIG. 15.

Reference numeral 11 designates a selecting circuit which has the same structure as the selecting circuits 5 and 6 described above and receives a plurality of electrical quantities $I\dot{Z}_{RS}$, $\dot{V}_{RS}$ and $W\dot{V}_{PRS}$ and zero volt. The selecting circuit 11 selects one of the inputted electrical quantities based on selecting signals from a microcomputer 14 in the same manner as the aforeentioned respective embodiments. Reference numeral 12 designates a sample-hold circuit, which is controlled by a control signal from the microcomputer 14. The sample-hold circuit 12 has such functions as to respectively sample and hold the outputs from the the selecting circuit 11. A comparator 13 receives, at the positive and negative input terminals thereof, the output from the selecting circuit 11 and the output of the sample-hold circuit 12, respectively. The comparator 13 judges that which one of the received signals is greater than the other thereof, and outputs a resultant logical state output signal. The microcomputer 14 has such functions as to control both the selecting circuit 11 and the sample-hold circuit 12 to supply predetermined electrical quantities to the input of the comparator 13, to receive, as the input signal $I_N$, the output signal of the comparator 13 under this condition, to process the received signals in digital procedure, to judge whether the relay is to be operated, and to produce an output signal $T_{M-RS}$. Naturally, these serial operations are executed in accordance with the programs incorporated within the microcomputer 14.

Figure 16:
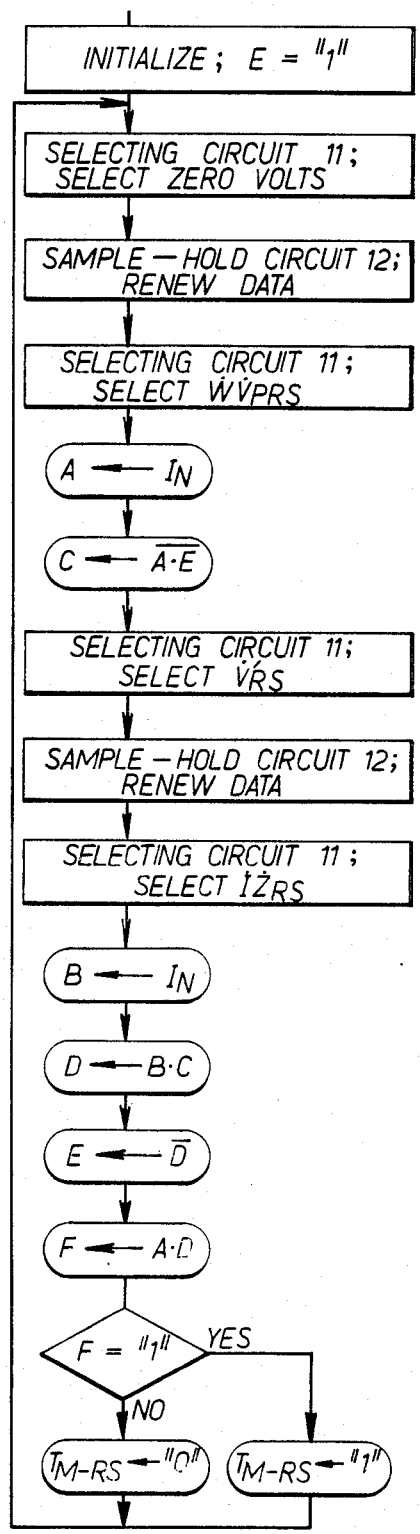
FIG. 16 is a flow chart illustrating the operations of the embodiment shown in FIG. 15.

The operation of the present invention will be described with reference to FIG. 16. Firstly, the sample-hold circuit 12 is initialized. Then the microcomputer 14 causes the selecting circuit 11 to select zero volt by applying a selecting signal. Nextly, the microcomputer 14 applies a control signal to the sample-hold circuit 12 which samples and holds the inputted zero volt. While at the same time, zero volt is supplied to the positive and negative input terminals of the comparator 13, respectively.

Nextly, the microcomputer 14 applys the selecting signal to the selecting circuit 11 so as to select the electrical quantity $W\dot{V}_{PRS}$.

The output of the comparator 13, at this instant, becomes a logical state "1" when (instantaneous value of $W\dot{V}_{PRS}$)>0V, and when (instantaneous value of $W\dot{V}_{PRS}$)≦0, then becomes a logical state "0". These logical states are received, as the input signal $I_N$, by the microcomputer 14, and transferred to the register A. Next, the inverse of a logical product of the stored contents of registers A and E, $\overline{A \cdot E}$, is obtained, and the result is transferred to the register C. Furthermore, by selecting signals from the microcomputer 14, the selecting circuit is caused to selects the electrical quantity $\dot{V}_{RS}$ which, inturn, is sampled and held by the sample-hold circuit 12. Next the microcomputer 14 applys the selecting signals only to the selecting circuit 11 so as to select the electrical quantity $I\dot{Z}_{RS}$. At this instant, the comparator 13 outputs a logical state "1" when (instantaneous value of $(I\dot{Z}_{RS}-\dot{V}_{RS})$)>0V, , and when otherwise, then outputs a logical state "0". These logical state signals are received, as the input signals $I_N$, by the microcomputer 14, and transferred to the register B. Next, a logical product of the stored contents of registers B and C is obtained, and the result is transferred to the register D, and inturn, the inverse of the stored content of register D is transferred to the register E. Nextly, a logical product of the stored contents of registers A and D, A.D, is obtained, and the result is transferred to the register F. The procedure causes the output $T_{M-RS}$ to be "1" when the stored content of register F is in "1" state, when in "0" state, then causes the output $T_{M-RS}$ to be "0". According to this embodiment, the mho characteristics shown in FIG. 2 can be obtained, however, other various characteristics can also be obtained by selecting input electrical quantities in various manners.

Figure 17:
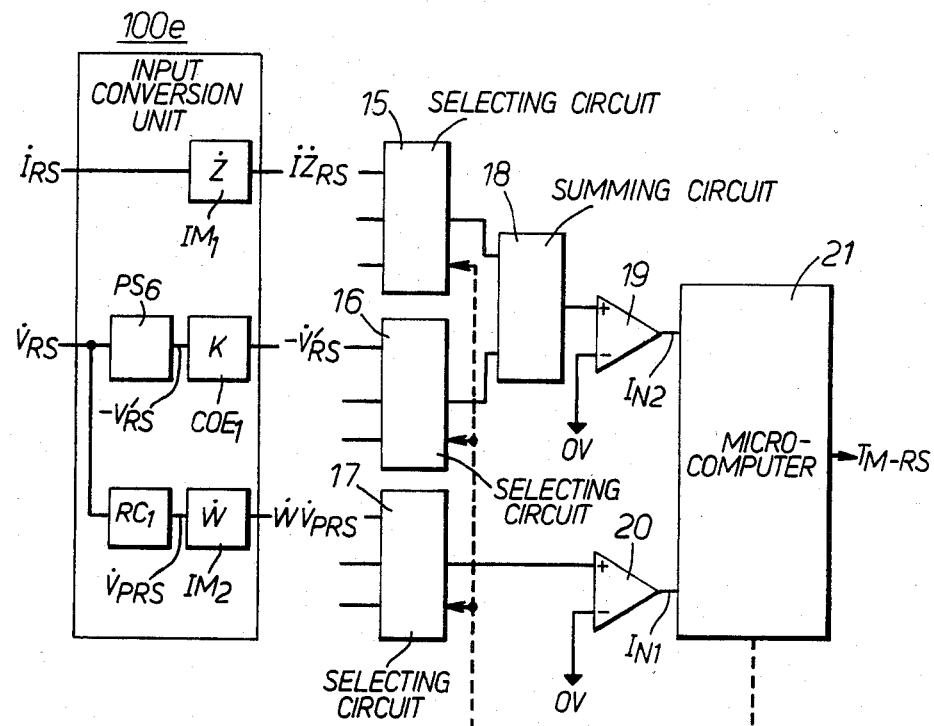
FIG. 17 is a block diagram of other embodiment according to the present invention.

FIG. 17 shows another embodiment according to the present invention which is designed to obtain mho characteristics. In this embodiment, there is provided an analog operation circuit such as of summation or subtraction circuit between a selecting circuit and a comparator. In FIG. 17, reference numeral 100e is an input conversion unit, which receives a current $I_{RS}$ and a voltage $\dot{V}_{RS}$ and output electrical quantities $I\dot{Z}_{RS}$, $(-\dot{V}_{RS})$ and $W\dot{V}_{PRS}$. In the input conversion unit 100e, IM1 is the simulated impedance circuit which receives the current $I_{RS}$ and outputs the electrical quantity $I\dot{Z}_{RS}$, PS6 is the phase shifter which receives the voltage $\dot{V}_{RS}$ and delays the phase of the inputted voltage $\dot{V}_{RS}$ by 180° to produces a voltage $(-\dot{V}_{RS})$ COE1 is the coefficient multiplier which receives the voltage $(-\dot{V}_{RS})$ and multiplies it by K (K<1) to produce an electrical quantity $(-\dot{V}_{RS}')$, RC1 is a resonance circuit which receives the voltage $\dot{V}_{RS}$ and outputs the electrical quantity $\dot{V}_{PRS}$, and IM2 is the impedance circuit which receives the voltage $\dot{V}_{PRS}$ and outputs the electrical quantity $W\dot{V}_{PRS}$. 15, 16 and 17 respectively designate selecting circuits, the same as the selecting circuits 5 and 6 of the aforementioned. A summing circuit 18 sums electrical quantities outputted from the selecting circuits 15 and 16, and produces the summed output. A comparator 19 receives the output of the summing circuit 18 at the positive input terminal thereof, and zero volt, at the negative input terminal thereof. A comparator 20 receives the output of the selecting circuit 17 at the positive input terminal thereof, and zero volt, at the negative input terminal thereof. Comparators 19 and 20 respectively judge that which of the respective two electrical quantities are greater than the others, and produce logical state signals. A microcomputer 21 has such functions as to control the selecting circuits 15, 16 and 17 to supply predetermined electrical quantities to the inputs of the comparators 19 and 20, to receive the outputs of the comparators 19 and 20 under these conditions, to process the received signals in digital procedure, and to judge whether the relay is to be operated. These serial operations are executed in accordance with the programs incorporated within the microcomputer 21 in the same manner as described above. Here, $T_{M-RS}$ represents the output signal of the microcomputer 21. $I\dot{Z}_{RS}$, $-\dot{V}_{RS}'$ and $W\dot{V}_{PRS}$, the inputs of the switching circuit 15, 16 and 17 are respectively electrical quantities, the same as those in the foregoing descriptions.

Figure 18:
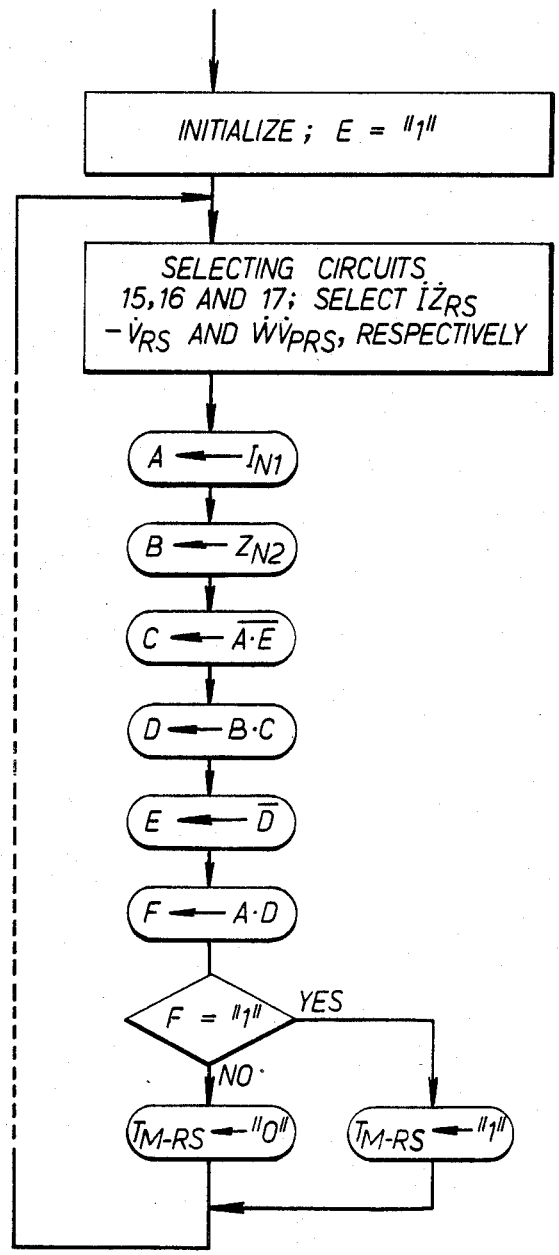
FIG. 18 is a flow chart illustrating the operations of the embodiment shown in FIG. 17.

The operations of the system shown in FIG. 17 will be described with reference to FIG. 18. First, the selecting circuits 15, 16 and 17 are controlled by selecting signals outputted from the microcomputer 21 so as to respectively select and produce the electrical quantities $I\dot{Z}_{RS}$, $(-\dot{V}_{RS})$ and $W\dot{V}_{PRS}$. The summing circuit 18 receives the electrical quantities $I\dot{Z}_{RS}$ and $(-\dot{V}_{RS})$, and produces the resultant summed output. The summed output, that is, the electrical quantity $(I\dot{Z}-\dot{V}_{RS})$ is supplied to the following comparator 19 at the positive input terminal thereof. Zero volt is supplied to the negative input terminal of the comparator 19. In this case, when the instantaneous value of the electrical quantity $(I\dot{Z}_{RS}-\dot{V}_{RS})$ is positive, the comparator 19 outputs a logical state "1". On the other hand, the comparator 20 receives the electrical quantity $\dot{V}_{PRS}$ at the positive input terminal thereof and zero volt, at the negative input terminal thereof. When the instantaneous value of the electrical quantity $\dot{V}_{PRS}$ is positive, the comparator 20 outputs a logical state "1".

The outputs of the comparators 19 and 20 are received by the microcomputer 21 as input signals $I_{N1}$ and $I_{N2}$, respectively, of which the input signal $I_{N1}$ is transferred to a register A, and the input signal $I_{N2}$, to a register B, respectively. Next, the inverse of a logical product of the stored contents of registers A and E, A.E is obtained, and the result is transferred to a register C. Nextly, a logical product of the stored contents of registers B and C, B.C is obtained, and the result is transferred to the register D, and the inverse of the stored content of register D is transferred to the register E. Moreover, a logical product of the stored contents of registers A and D, A.D is obtained, and the result is transferred to the register F. The procedure causes the output $T_{M-RS}$ to be "1" when the stored content of register F is in "1" state, and when in "0" state, then causes the output $T_{M-RS}$ to be "0". As a result, the mho characteristics can be obtained.

Figure 19A:
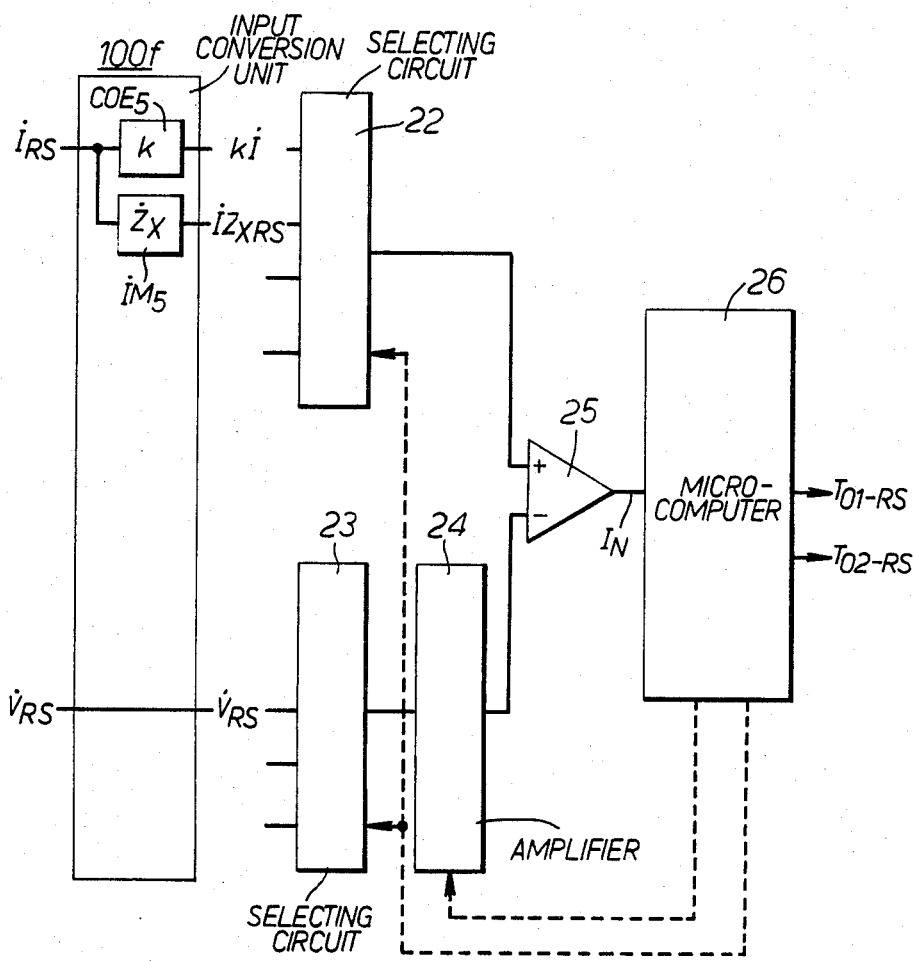
FIG. 19(a) is a block diagram of still another embodiment according to the present invention.
Figure 19B:
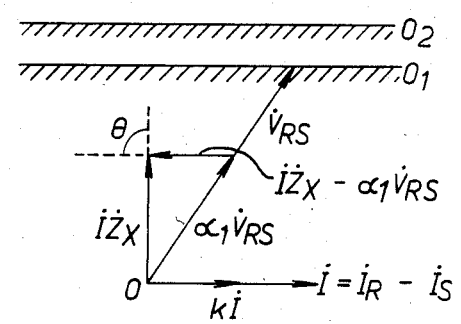
FIG. 19(b) is a characteristic diagram of the reactance relay shown in FIG. 19(a)

FIG. 19(a) shows another embodiment according to the present invention, which is designed to obtain the reactance characteristics 01 and 02 shown in FIG. 19(b). In this embodiment, there is provided an amplifier between a selecting circuit and a comparator. In FIG. 19(a), 100f designates an input conversion unit which receives a current $\dot{I}_{RS}$ and a voltage $\dot{V}_{RS}$ and outputs electrical quantities $k.\dot{I}_{RS}$, $I\dot{Z}_{XRS}$ and $V_{RS}$. In the input conversion unit, COE5 is a coefficient multiplier which receives the current $\dot{I}_{RS}$ and multiplies the current $I_{RS}$ by k to produce an electrical quantity $k.\dot{I}_{RS}$. IM5 is an impedance circuit which receives the current $\dot{I}_{RS}$ and outputs the electrical quantity $I\dot{Z}_{XRS}$. The inputted voltage $\dot{V}_{RS}$ is outputted without being converted with respect to value and phase thereof.

Reference numerals 22 and 23 designate selecting circuits, and 24, an amplifier, respectively. The amplifier 24 receives the output of the selecting circuit 23 and is controlled by a microcomputer 26 so as to vary a gain thereof. A comparator 25, which is the same as the comparator 7, receives the output of the selecting circuit 22 at the positive input terminal thereof, and also receives the output of the amplifier 24 at the negative input terminal thereof. The comparator 25 judges that which one of the two received electrical quantities is greater than the other, and outputs the resultant logical state signal. A microcomputer 26 has such functions as to control the selecting circuits 22 and 23, and the amplifier 24 to supply predetermined electrical quantities to the comparator 25, to receive the output signal of the comparator 25 under this condition, to process the received signals in digital procedure, and to judge whether the relay is to be operated. These serial operations are executed in accordance with the programs stored within the microcomputer 26.

In FIG. 19(a), there are provided the selecting circuits 22 and 23 for the benefit of possible expansion to a polyphase-type structure, however, when the system is utilized in a single phase, two selecting circuits are not necessarily required. Here, the selecting circuit 22 receives the input signals $k\dot{I}_{RS}$ and $I\dot{Z}_{XRS}$, of which $K\dot{I}_{RS}$ is an electrical quantity indicative of a current which is proportional to the current $(\dot{I}_R-\dot{I}_S)$, and $I\dot{Z}_{XRS}$ is an electrical quantity indicative of a current which leads the current $I_{RS}$ by an electrical angle of 90°. The input signal of the selecting circuit 23 is the line voltage $\dot{V}_{RS}$, and the relationship between these input signals is shown in FIG. 19(b).

Figure 20:
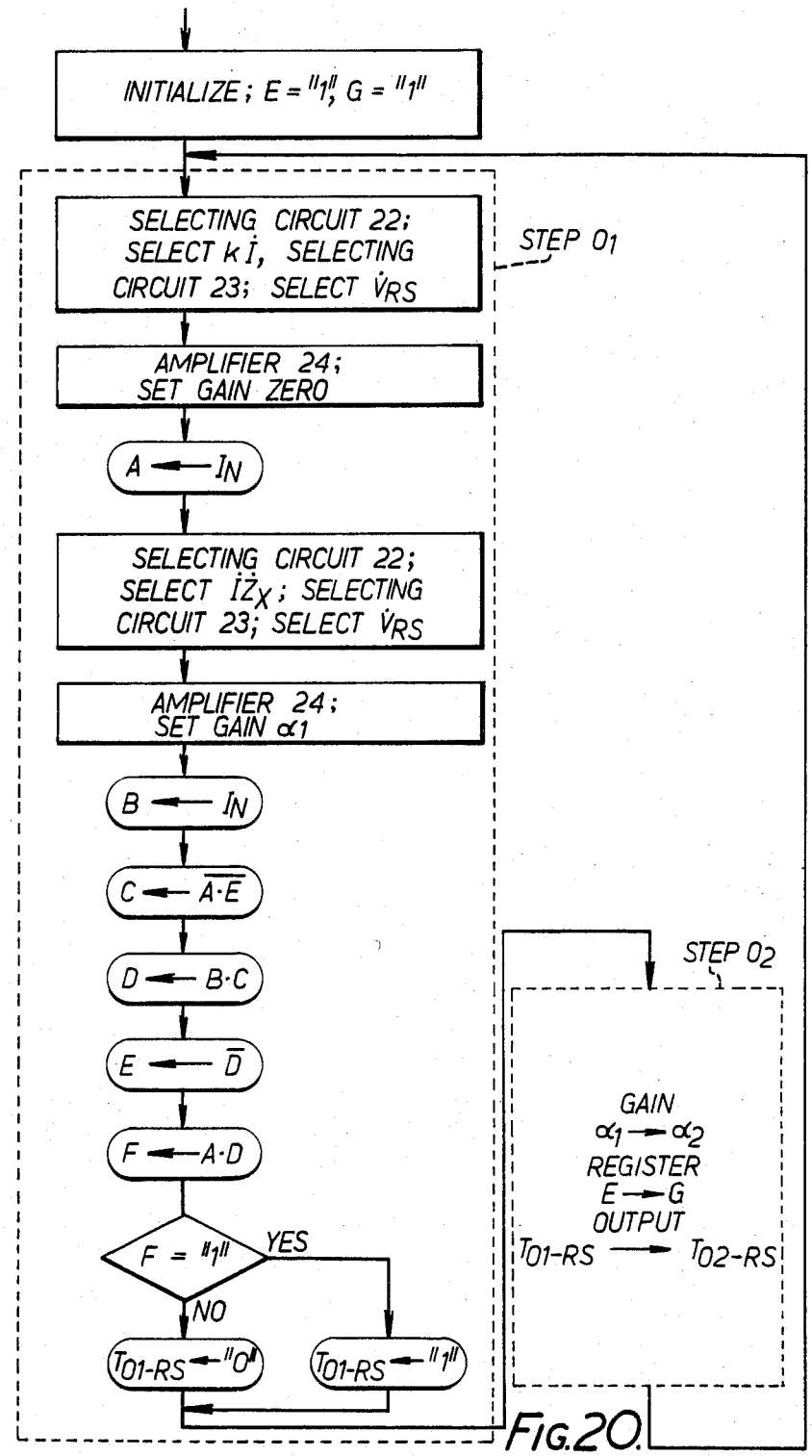
FIG. 20 is a flow chart illustrating the operations of the embodiment shown in FIG. 19(a)

Referring to FIG. 20, the operations of the above-described system will be described. First, in 01 step, the procedure causes the selecting circuits 22 and 23 to select electrical quantities $KI_{RS}$ and $\dot{V}_{RS}$, respectively, inturn, causes the amplifier 24 to set the gain thereof to 0. As a result, the output of the comparator 25 becomes "1" when the instantaneous value of the electrical quantity $K\dot{I}_{RS}$ from the selecting circuit 22 is positive, and when negative or zero, then becomes "0". This output signals is received by the microcomputer 26 as an input signal IN, and transferred to a register A. Next, the procedure causes the selecting circuits 22 and 23 to select electrical quantities $I\dot{Z}_{XRS}$ and $\dot{V}_{RS}$, respectively, inturn, causes the amplifier 24 to set the gain thereof to $\alpha 1$. Consequently, the output of the comparator 25 becomes "1" when the instantaneous value of the input signal $(I\dot{Z}_{XRS}-\alpha 1.\dot{V}_{RS})$ is positive, this output is received by the microcomputer 26 as the input signal $I_N$, and transferred to the register B.

Nextly, the inverse of a logical product of the stored contents of registers A and E, A.E is obtained, and the result is transferred to the register C. Next, a logical product of the stored contents of the registers B and C, B.C, is obtained, and the result is transferred to a register D, then the inverse of the stored content of register D is transferred to a register E. Further, a logical product of the stored contents of the registers A and D, A.D is obtained, and the result is transferred to a register F. As a result, the procedure causes the output T01-RS to be "1" when the stored content of register F is in "1" state, and when in "0" state, then causes the output T01-RS to be "0". The procedure of the above described operations can obtain the first stage reactance characteristics $0_1$ shown in FIG. 19(b).

For the procedure in 02 step, there are provided a register G in place of the register E, and an output T02-RS in place of the output T01-RS so as to avoid interference with the procedure in the 01 step. Further, the amplifier 24 is provided with a gain $\alpha 2$ instead of $\alpha 1$, and this can obtain the second stage reactance characteristics $0_2$ shown in FIG. 19(b). Other operations are the same as in the 01 step, so that the description thereof is omitted.

In the aforementioned embodiments, it is indicated that controlling the gain of amplifier can obtain plural characteristics, and that causing the gain of amplifier to be zero can obtain the operation, the same as that of selecting circuit. Moreover, this embodiment is not limited to a reactance-type distance relay system.

Figure 21:
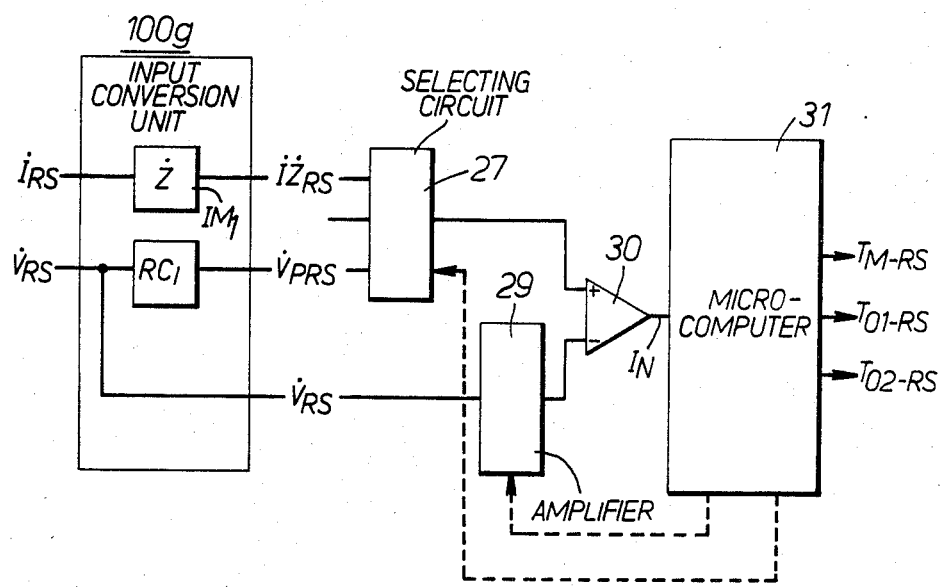
FIG. 21 is a block diagram of other embodiment according to the present invention.

FIG. 21 is a block diagram of another embodiment according to the present invention, which is provided with both mho and reactance characteristics. In this embodiment, by executing appropriate delayed operations, a relaying system with more simplified structure can be obtained. In FIG. 21, 100g designates an input conversion unit which receives a current $I_{RS}$ and a voltage $\dot{V}_{RS}$ and outputs electrical quantities $\dot{IZ}_{RS}$, $V_{PRS}$ and $V_{RS}$. The input conversion unit 100g includes the simulated impedance circuit IM1 and the resonance circuit RC1.

There are provided a selecting circuit 27, the same as the selecting circuits 5 and 6 and an amplifing circuit 29, with a variable gain, and they are respectively controlled by a microcomputer 31. A comparator 30 receives the output of the selecting circuit 27 at the positive input terminal thereof, and the output of the amplifier, at the negative input terminal thereof. The comparator 30 judges that which one of the two received electrical quantities is greater than the other, and outputs the resultant logical state signal. The microcomputer 31 performs such functions as to control the selecting circuit 27 and the amplifier 29 to supply predetermined electrical quantities to the comparator 30, to receive the output of the comparator 30 under these conditions, to process the received signals in digital procedure, and to judge whether the relay is to be operated. These serial operations are executed in accordance with the programs stored within the microcomputer 31.

Here, the electrical quantities $\dot{IZ}_{RS}$ and $\dot{V}_{PRS}$, the input signals of the switching circuit 27, and the electrical quantity $\dot{V}_{RS}$, the input signal of the amplifier 29 are respectively the same as those in the foregoing descriptions. $T_{M-RS}$ represents the output of mho characteristics, and $T_{01-RS}$ and $T_{02-RS}$ represent the respective outputs corresponding to the respective reactance characteristics 01 and 02 created by the variations of gain of the amplifier 29.

Figure 22A:
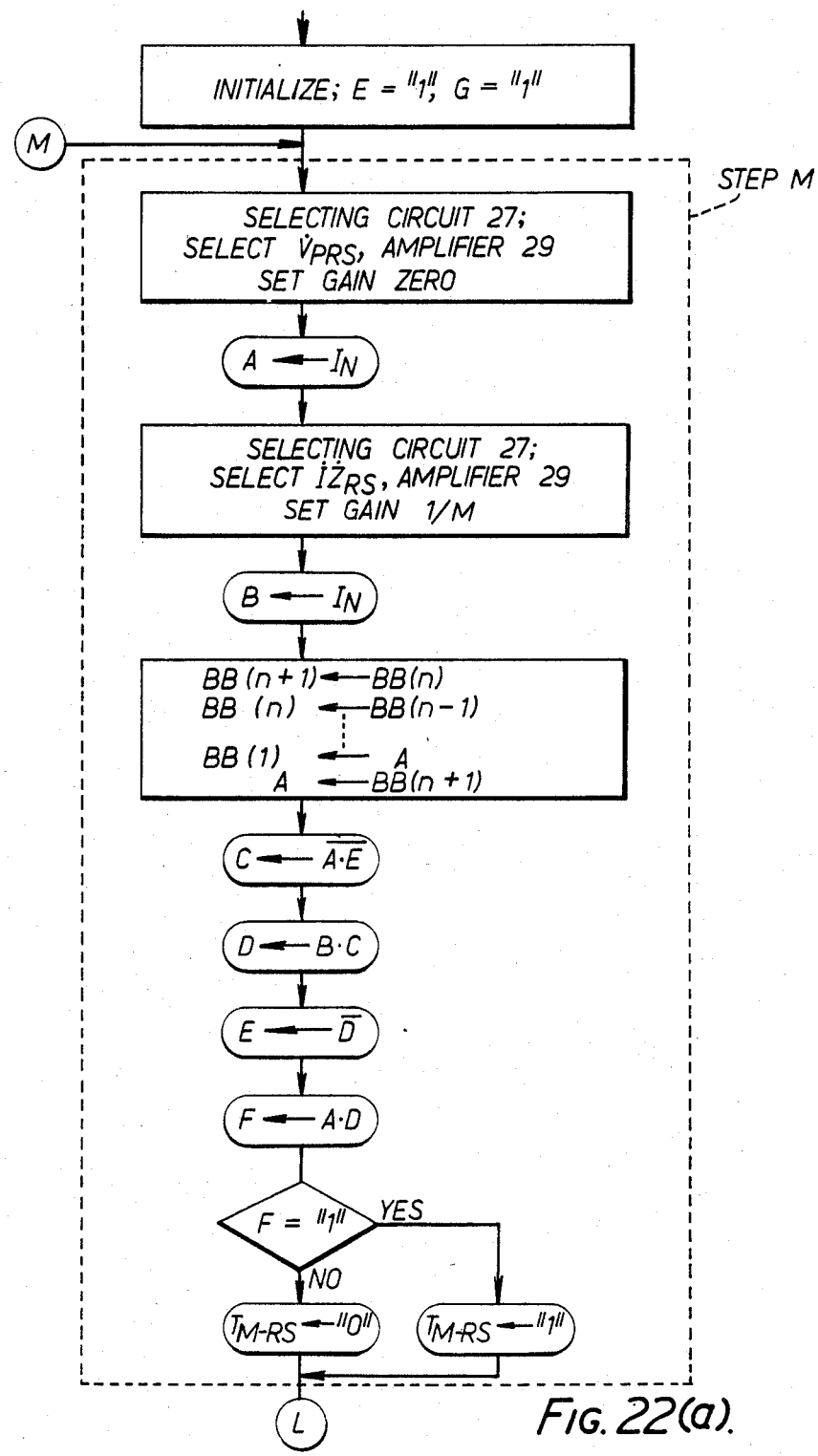
FIGS. 22(a) and 22(b) are flow charts illustrating the operations of the embodiment shown in FIG. 21.
Figure 22B:
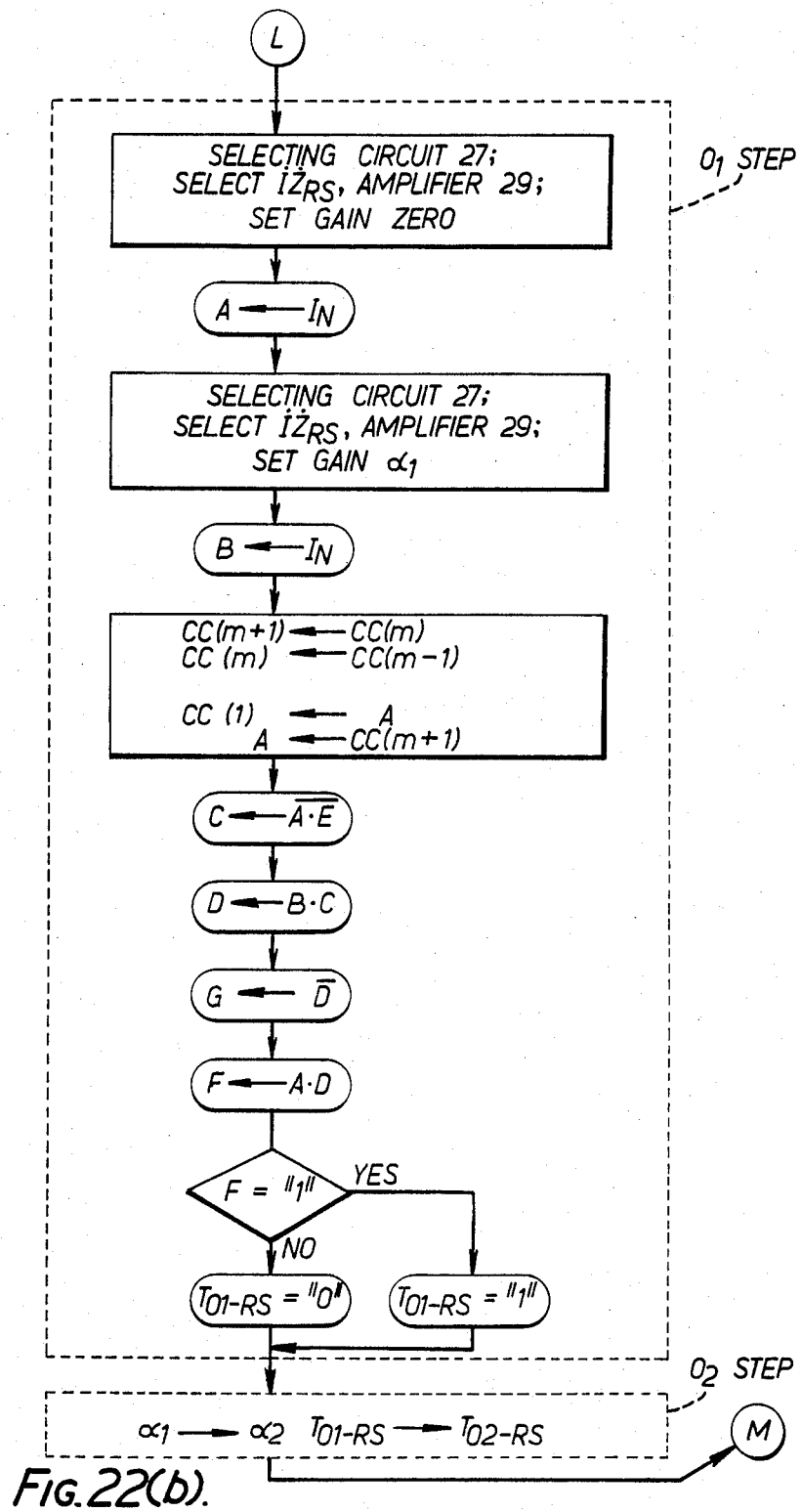

Referring to FIG. 22, the operations of the aforementioned system will be described. FIG. 22(a) shows a flowchart as to the mho relay component, and FIG. 22(b) shows a flowchart as to the reactance relay component. In FIG. 22(b), 01 step and 02 step represent only the output change of the reactance relay component in accordance with the variations of gain of the amplifier 29.

First, in M step, the microcomputer 31 causes, by applying selecting signals, the selecting circuit 27 to select the electrical quantity $\dot{V}_{PRS}$, and simultaneously causes the amplifer 29 to set the gain thereof to zero. As a result, the output of the comparator 30 becomes "1" when the instantaneous value of the electrical quantity $\dot{V}_{PRS}$ from the selecting circuit 27 is positive. This output "1" is received by the microcomputer 31 as the input signal $I_N$, and transferred to the register A.

Next, the microcomputer 31 controls the selecting circuit 27 to select and output the electrical quantity $\dot{IZ}_{RS}$ and simultaneously controls the amplifier 29 to set the gain thereof to 1/M. In this case, the output of comparator 30 becomes "1" when the instantaneous value of the electrical quantity $(\dot{IZ}_{RS}-\dot{V}_{RS}/M)$ is positive. This output is received by the microcomputer 31 as the input signal $I_N$, and transferred to a register B. Next, there are provided (n+1) pieces of storage areas, and the procedure controls these areas, in the same manner as a shift-register, so as to cause a register A to obtain the value of the register A which was in n-piece before. Here, n is selected as a number corresponding to an electrical angle of 90°.

Nextly, the inverse of a logical product of the stored contents of registers A and E, A.E is obtained, and the result is transferred to a register C. Next, a logical product of the stored contents of registers B and C, B.C is obtained, and the result is transferred to a register D, then the inverse of the stored content of the register D is transferred to the register E. Further, a logical product of the stored contents of the registers A and D, A.D is obtained, and the result is transferred to a register F. There, the procedure causes the output $T_{M-RS}$ to be "1" when the stored content of the register F is in "1" state, and when in "0" state, then causes the output $T_{M-RS}$ to be "0".

Consequently, when the phase difference between the electrical quantities $\dot{V}_{RS}$ and $(\dot{IZ}_{RS}-\dot{V}_{RS}/M)$ lies within 90°, the output $T_{M-RS}$ becomes "1".

In the reactance component, first, the microcomputer 31 controls, by applying control signals outputted therefrom, the selecting circuit 27 to select the electrical quantity $\dot{IZ}_{RS}$, and also controls the amplifier 29 to set the gain thereof to zero. As a result, when the instantaneous value of the electrical quantity $\dot{IZ}_{RS}$ is positive, the output of the comparator 30 becomes "1". This output is received by the microcomputer 31 as the input signal $I_N$, and transferred to a register A.

Next, the microcomputer 31 controls, by applying control signals outputted therefrom, the selecting circuit 27 to select the electrical quantity $\dot{IZ}_{RS}$, and also controls the amplifier 29 to set the gain thereof to α1. As a result, when the instantaneous value of the electrical quantity $(IZ_{RS}-\alpha 1 V_{RS})$ is positive, the output of the comparator 30 becomes "1". This output is received by the microcomputer 31 as the input signal $I_N$, and transferred to a register B. Further, there are provided (m+1) pieces of storage areas, and the procedure controls these areas, in the same manner as a shift-register, so as to cause the register A to obtain the value of the register A which was in m-piece before. Here, m is selected as a number corresponding to a line impedance angle.

Nextly, the inverse of a logical product of the stored contents of registers A and G, A.G is obtained, and the result is transferred to a register C. Next, a logical product of the stored contents of registers B and C, B.C is obtained, and the result is transferred to the register D. Next, the inverse of the stored content of the register D is transferred to the register G. Further, a logical product of the stored contents of the registers A and D, A.D is obtained, and the result is transferred to the register F. As a result, the procedure causes the output $T_{01-RS}$ to be "1" when the content of the register F is in "1" state, and when in "0" state, then causes the output $T_{01-RS}$ to be "0".

As described above, when the phase difference between the electrical quantities IZ and $(IZ_{RS}-\alpha V_{RS})$ lies within 180°, the output $T_{01-RS}$ becomes "1".

The operations of 02 step are identical to those of 01 step except that the gain of amplifier is set to α2 instead of α1, and that the output $T_{02-RS}$ in place of $T_{01-RS}$.

In all other embodiments described so far, for instance, in case of the mho characteristics, both the electrical quantity $WV_{RS}$ indicative of a voltage which lags behind the voltage $V_{RS}$ by 90° and the electrical quantity $IZ_{RS}$ indicative of a current which leads the current $(I=I_R-I_S)$ by a line impedance angle have been necessitated, however, in this embodiment of the present invention the system can be achieved only with the latter.

Moreover, in case of the reactance characteristics, the voltage $\dot{V}_{RS}$ and the electrical quantity $\dot{IZ}_{RS}$ indicative of a current which leads the current $I_{RS}$ by a line impedance angle are sufficient to the system according to this embodiment, so that a distance relaying system with more simplified structure can be realized.

Figure 23:
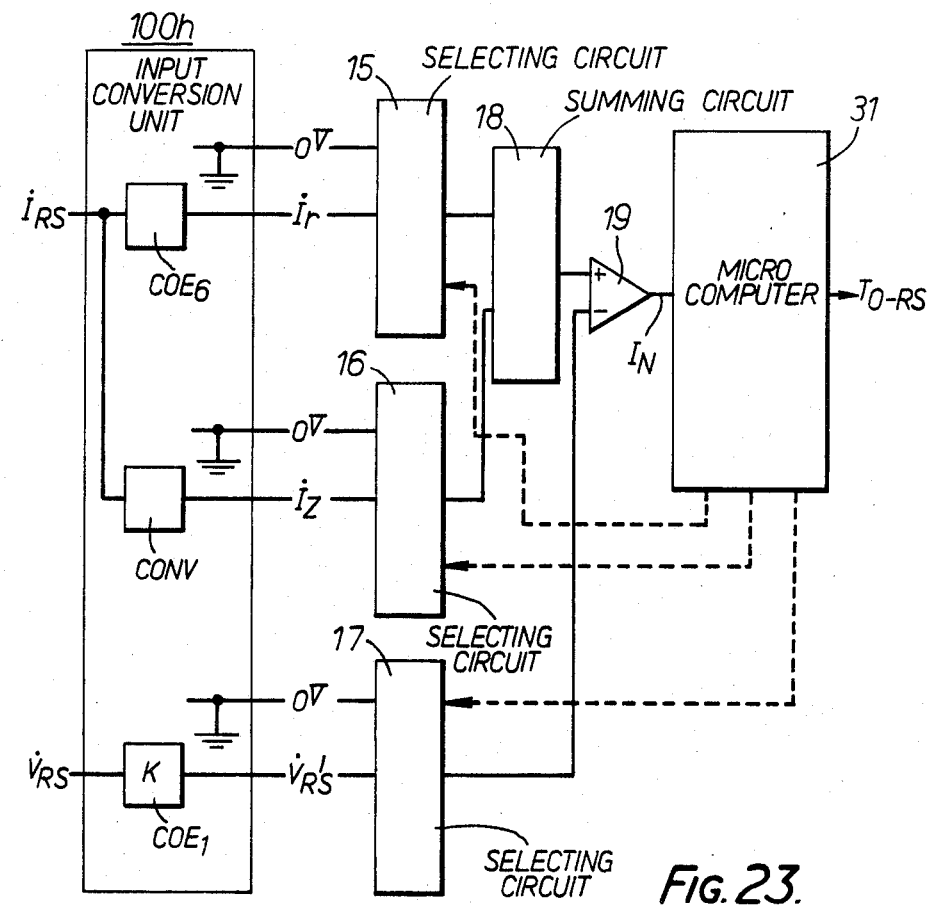
FIG. 23 is a block diagram of other embodiment according to the present invention.
Figure 24A:
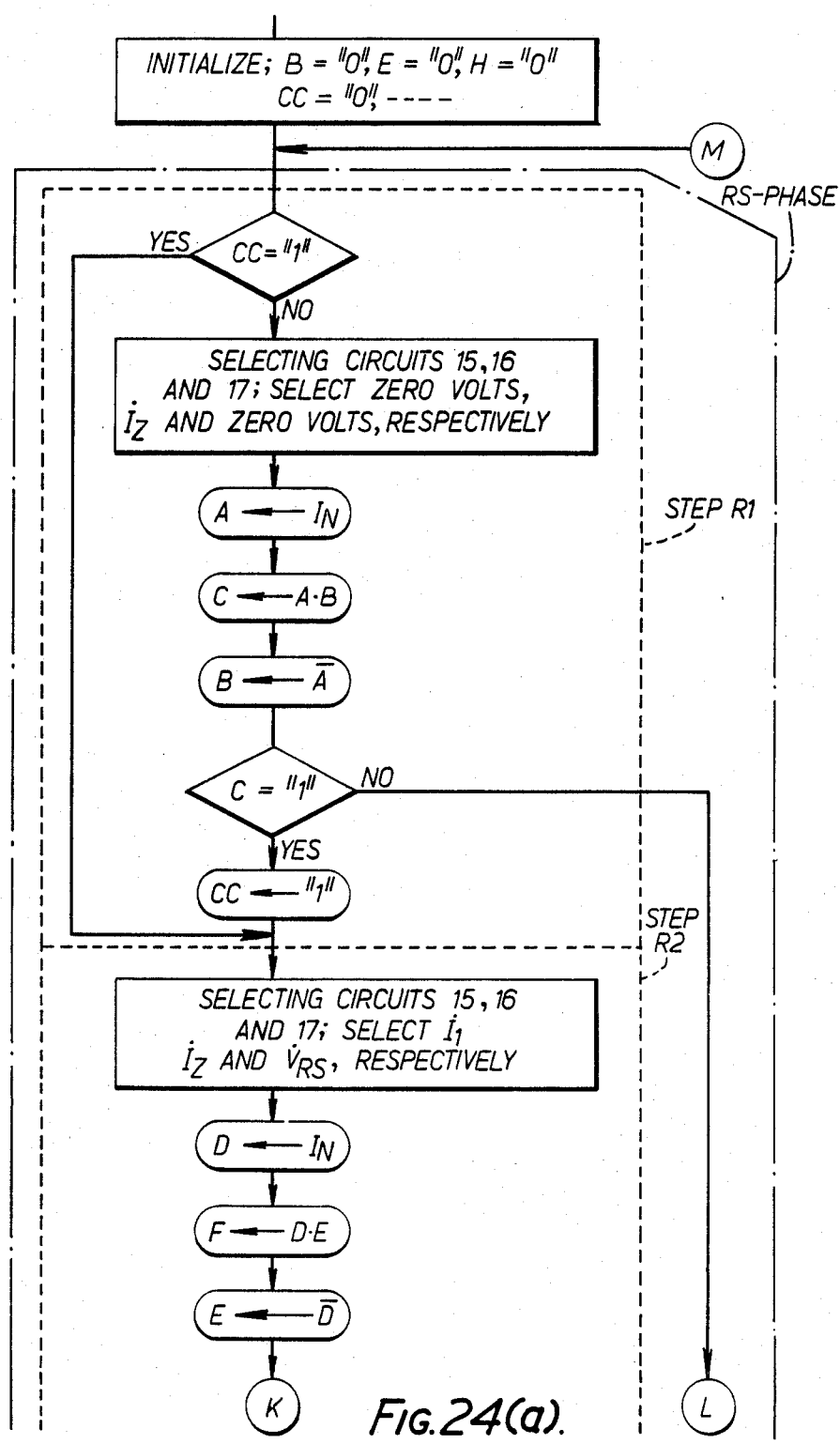
FIG. 24(a) and 24(b) are flow charts illustrating the operations of the embodiment shown in FIG. 23.
Figure 24B:
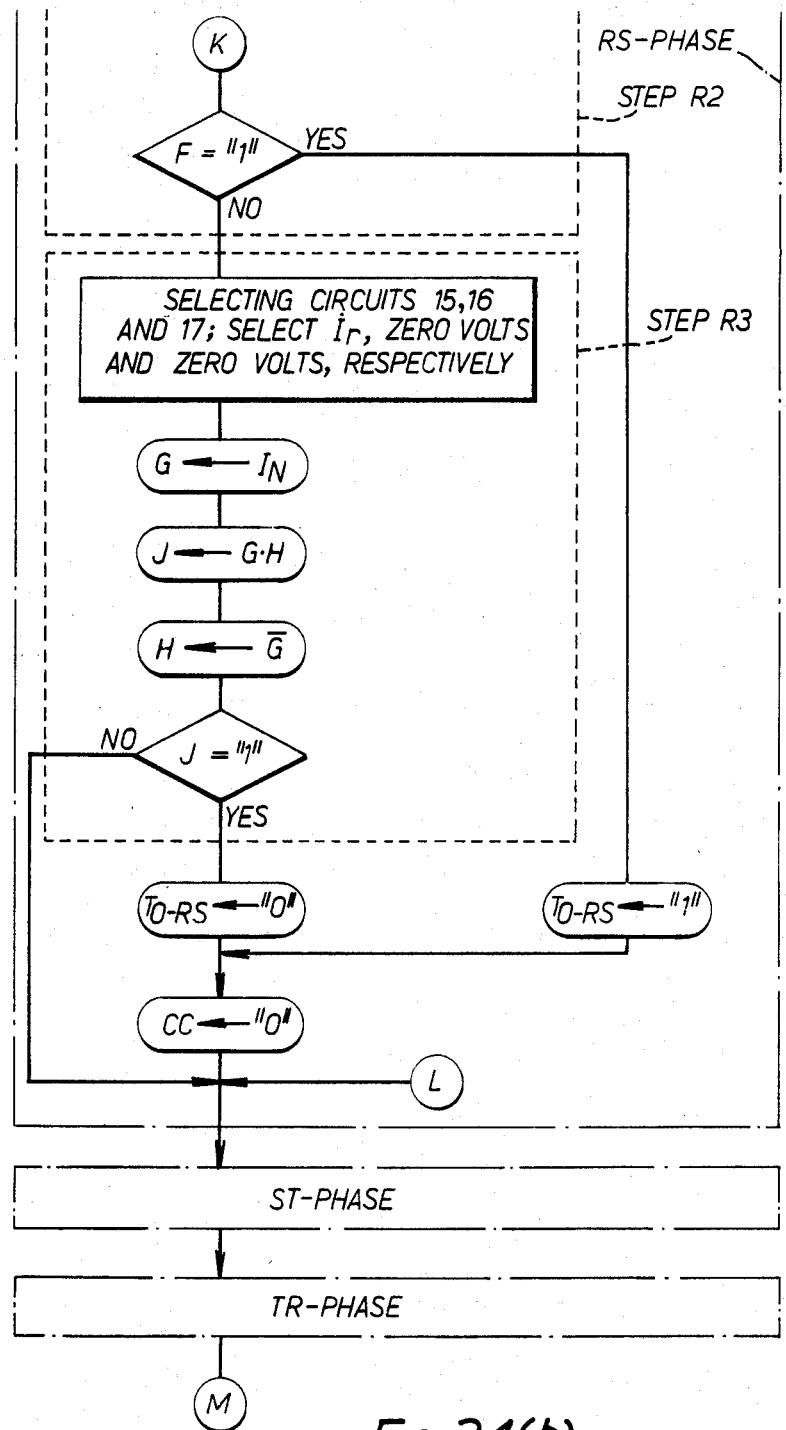

FIG. 23 is a block diagram of an embodiment of a reactance relay with plural-slope-response characteristics according to the present invention, which is designed to judge the sequence of the vectors of more than three instead of two. In FIG. 23, reference numerals 15 through 19 correspond to those designated identical reference numerals shown in FIG. 17, 31 designates a microcomputer, and $T_{O-RS}$ represents the output of the system. 100h designates an input conversion unit which receives a current $\dot{I}_{RS}$ and a voltage $\dot{V}_{RS}$ and outputs electrical quantities $\dot{I}r$, $\dot{I}z$ and $\dot{V}_{RS}'$ and zero volt as a reference voltage. In the input conversion unit 100h, COE6 is a coefficient multiplier which receives the current $\dot{I}_{RS}$ and produces an electrical quantity by varying the amplitude of the current $\dot{I}_{RS}$. CONV is a conversion circuit which receives the current $\dot{I}_{RS}$ and advances the phase of the current $\dot{I}_{RS}$ by line impedance $\theta$ and reduces the magnitude of the current $\dot{I}_{RS}$ by an appropriate amount so as to produce a current $\dot{I}_Z$ as an output signal of the conversion circuit CON. COE1 is a coefficient multiplier which receives the voltage $\dot{V}_{RS}$ and output the electrical quantity $\dot{V}_{RS}'$. Input signals of the selecting circuit 15 are the zero volt and the electrical quantity $\dot{I}r$. Input signals of the selecting circuit 16 are zero volt and the electrical quantity $\dot{I}_Z$. Input signals of the selecting circuit 17 are zero volt and the electrical quantity $\dot{V}_{RS}'$, which is an electrical quantity indicative of a voltage which is proportional to the line voltage and of in-phase thereto. A summing circuit 18 receives the output signals of the selecting circuits 15 and 16, and supplies the summed-up signal to the positive input terminal of a comparator 19. The output of the selecting circuit 17 is supplied to the negative input terminal of the comparator 19. The operations of the embodiment shown in FIG. 23 will be described with reference to FIG. 24(a) and 24(b). First, in R1 step of R-S phase, the procedure judges whether the stored content of a register CC is in "1" state or not, and if in "1", advances to R2 step, whereas in "0", then, executes the followings. A microcomputer 31 controls, by applying selecting signals outputted therefrom, the selecting circuit 16 to select the electrical quantity $\dot{I}_Z$, and simultaneously controls the switching circuits 15 and 17 to select and output zero volt, respectively. Here, the summing circuit 18 outputs $\dot{I}_Z$ which is the input signal from the selecting circuit 16, thus the output of the comparator 19 becomes "1" when the instantaneous value of the electrical quantity $\dot{I}_Z$ is positive, whereas when negative or zero, then becomes "0". This output is received by the microcomputer 31 as an input signal $I_N$, and transferred to a register A. Next, a logical product of the stored contents of registers A and B, A.B is obtained, and the result is transferred to a register C. Then, the inverse of the stored content of the register A is transferred to the register B. As a result, the procedure causes a register CC to be "1" then, advances to R2 step when the register C is in "1" state, and when in "0", then advances to the following phase (S-T phase). This indicates that the procedure locates, in the R1 step, an instant at which the polarity of the electrical quantity $\dot{I}r$ changes from negative to positive. And when such instant can be detected, that is, when the stored content of the register C becomes "1", the procedure causes the stored content of the register CC to be "1" and advances to the R2 step.

Similarly, in the R2 step, the procedure causes the selecting circuits 15, 16 and 17 to select the electrical quantities $\dot{I}r$, $\dot{I}z$ and $\dot{V}_{RS}'$ respectively so as to establish an electrical quantity $(\dot{I}r+\dot{I}z-\dot{V}_{RS}')$, and an instant at which the polarity of the electrical quantity $(\dot{I}r+\dot{I}z-\dot{V}_{RS}')$ changes from negative to positive is located.

Figure 25:
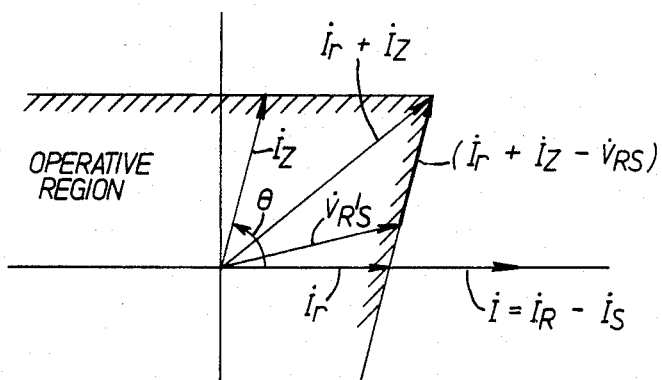
FIG. 25 is a characteristic diagram of the response with different slopes of the reactance relay shown in FIG. 23.

In the R3 step, the procedure causes the selecting circuit 15 to select the electrical quantity $\dot{I}r$, and also causes the selecting circuits 16 and 17 to select zero volt, respectively so as to locate an instant at which the polarity of the electrical quantity $\dot{I}r$ changes from negative to positive. When the polarity of the electrical quantity $(\dot{I}r+\dot{I}z-\dot{V}_{RS}')$ changes after the R1 step, the procedure causes the output $T_{O-RS}$ to be "1". When the polarity of the electrical quantity $\dot{I}r$ changes, then causes the output $T_{O-RS}$ to be "0" and also causes the stored content of register CC to be "0", then advances to the following phase (S-T phase). However, when both the electrical quantities $(\dot{I}r+\dot{I}z-\dot{V}_{RS}')$ and $\dot{I}r$ make no change, in polarity, the procedure advances, without causing both the outputs $T_{O-RS}$ and the stored content of register CC any change, to the following phase (S-T phase). Namely, the procedure causes the output $T_{O-RS}$ to be "1" when the sequence of electrical quantities is in the order of $\dot{I}z$, $(\dot{I}r+\dot{I}z-\dot{V}_{RS}')$ and $\dot{I}r$, and when in the order of $\dot{I}z$, $\dot{I}r$ and $(\dot{I}r+\dot{I}z-\dot{V}_{RS}')$, then causes the output $T_{O-RS}$ to be "0". (refer to FIG. 25).

The procedures with respect to the S-T phase and the T-R phase are also made in the same manner as in the R-S phase as described above, and all the phase procedures are repeatedly executed by the microcomputer 31.

In the aforementioned embodiments of this invention, all the controls of the selecting circuits, the amplifiers and the like are described to be made by a single microcomputer such that the microcomputer specifys the addresses to be controlled, and while at the same time applys the instruction data of ON or OFF to such specified addresses. However, the present invention is not limited to the above-described methods, and such method can also be applicable that besides a microcomputer, there is provided a control circuit which controls the selecting circuits or the amplifier and transfers the contents of the control thereof to the microcomputer.

Namely, in case of relays provided with certain specified functions, it is necessary to periodically execute the sequence of controlling the selecting circuits or amplifier. In this case it is possible to provide, besides a microcomputer, a control circuit which exclusively executes such periodical controls and transfers the contents of the control thereof, by utilizing interruption commands, to the microcomputer so as to judge whether the relay is to be operated.

In the respective aforementioned embodiments, when the instantaneous values of the output electrical quantities selected by the selecting circuits and the synthesized quantity of output electrical quantities, such as $\dot{W}\dot{V}_{PRS}$, $KI$, $\dot{I}\dot{Z}_{RS}$, $(\dot{I}\dot{Z}_{RS}-\dot{V}_{RS})$ and $(\dot{I}\dot{Z}_{RS}-\dot{V}_{RS}/M)$ are positive, the procedure causes the output of the comparator to be "1", and responds in accordance with the sequence in which such plural electrical quantities change from negative to positive. However this can also be executed quite similarly by using the sequence in which such electrical quantities change from positive to negative. Further a quite similar response can be obtained, for example, when the reversed polarities of the electrical quantities $\dot{W}\dot{V}_{PRS}$, $\dot{W}\dot{V}_{PST}$ and $\dot{W}\dot{V}_{PTR}$, namely, $(-\dot{W}\dot{V}_{PRS})$, $(-\dot{W}\dot{V}_{PST})$ and $(-\dot{W}\dot{V}_{PTR})$ are used as the input signals of the selecting circuits in FIG. 4, and the inverse of a logical state of the register A is used in FIGS. 6 and 7.

Therefore, this invention is not limited to adopt the sequence in which all the electrical quantities to be compared, for example, $\dot{W}\dot{V}_{PRS}$ and $(\dot{I}\dot{Z}_{RS}\text{-}\dot{V}_{RS})$ change from and into the same polarity. But it is also applicable to detect the sequence in which, when one electrical quantity such as $\dot{W}\dot{V}_{PRS}$ is in positive while the other electrical quantity such as $(\dot{I}\dot{Z}_{RS}\text{-}\dot{V}_{RS})$ is in negative, which one reverses earlier the polarity thereof than the other, and to respond.

Furthermore, this invention is not limited to detect the sequence in which the instantaneous values of the selected electrical quantities such as $\dot{W}\dot{V}_{PRS}$ and $(\dot{I}\dot{Z}_{RS}\text{-}\dot{V}_{RS})$ shift from positive to negative or from negative to positive, namely, the sequence in which they shift from one region to the other region which are defined by the instantaneous value zero. But it is also possible to execute the procedure by detecting the sequence in which the instantaneous values of the selected electrical quantities shift from one specific region which are defined by specific values, such as $\dot{W}\dot{V}_{PRS} < Kv$ or $(\dot{I}\dot{Z}_{RS}\text{-}\dot{V}_{RS}) < Kz$ to the other region (where Kv and Kz are positive specified constant electrical quantities). In this case, provided the constants Kv and Kz are sufficiently small, the characteristics as the distance relay upon such ordinary failures as short-circuits or ground faults make substantially no change. Further, it is possible to securely render the distance really inoperative when the voltage and current inputs become zero and both the electrical quantities $\dot{W}\dot{V}_{PRS}$ and $(\dot{I}\dot{Z}_{RS}\text{-}\dot{V}_{RS})$ are rendered zero.

Moremore, the judgment can be readily made as to whether the instantaneous value of the synthesized electrical quantity such as $(\dot{I}\dot{Z}_{RS}\text{-}\dot{V}_{RS})$ is greater than the positive constant electrical quantity Kz by applying the electrical quantity $\dot{I}\dot{Z}$ and $\dot{V}_{RS}$ to the subtraction circuit so as to obtain the synthesized electrical quantity $(\dot{I}\dot{Z}_{RS}\text{-}\dot{V}_{RS})$ which, in turn, is applied to the comparator with the constant electrical quantity Kz.

As described above, according to the present invention, the multi-function relaying system and polyphase relaying system which are provided with various relaying characteristics can be readily realized by virtue of the system structure such that the plural electrical quantities required to the relaying operation can be received by the digital processing unit with selecting operations thereof, wherein such received electrical quantities are processed in serial operations of digital procedure. In addition, such system structure can effectively contribute to reduction in system scale.

Obviously, numerous (additional) modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A protective relaying system which detects a fault in an electric power system having a circuit breaker by using a current and a voltage of said electric power system and causes said circuit breaker to trip in accordance with the fault detection so as to protect said electric power system, said protective relaying system, comprising:

input conversion means adapted for connecting said electric power system to receive a first input signal corresponding to said current and a second input signal corresponding to said voltage and for converting the magnitude and/or the phase of said first and second input signals to produce a plurality of electrical quantities including a first electrical quantity, a second electrical quantity and a third electrical quantity;

comparing means connected to said input conversion means for receiving said first, second and third electrical quantities, for comparing said first electrical quantity with said second electrical quantity to produce a first logical state signal based on a first comparing result and comparing said third electrical quantity with a fourth electrical quantity to produce a second logical state signal based on a second comparing result cyclically, and for producing a logical state signal including said first and second logical state signals cyclically; and digital data processing means connected to said comparing means for receiving cyclically said logical state signal, for producing a first and a second serial logical state signals based on said cyclically received first and second logical state signals, respectively, and for judging whether a phase-rotation sequence of said first and second serial logical state signals equals a predetermined sequence to produce a protection relay output signal based on the judging result, said protection relay output signal being adapted for using to trip said circuit breaker.

2. The protective relaying system according to claim 1, wherein:

said digital data processing means judges said phase-rotation sequence based on a sequence of instants when said first and second serial logical state signals change from a first specified region to a second specified region, respectively.

3. The protective relaying system according to claim 1, wherein:

said digital data processing means judges said phase-rotation sequence based on whether said first serial logical state signal changes from a first specified region to a second specified region between a first time instant when said second serial logical state signal changes from said first specified region to said second specified region and a second time instant when said second serial logical state signal changes from said second specified region to said first specified region.

4. The protective relaying system according to claim 2 or 3, wherein:

said comparing means receives as said fourth electrical quantity a DC reference voltage biased such an amount that said digital data processing means is prevented from misoperation when said third electrical quantity is not inputted.

5. The protective relaying system according to claim 2 or 3, wherein:

said comparing means receives zero volt as said fourth electrical quantity.

6. The protective relaying system according to claim 1, wherein:

said comparing means includes, first selecting means connected to said input conversion means for receiving said first and third electrical quantities for selecting cyclically one of said first and third electrical quantities to produce a first selection signal based on a first selecting signal, second selecting means connected to said input conversion means for receiving said second electrical quantities, for receiving said fourth electrical quantity, and for selecting cyclically one of said second and fourth electrical quantities to produce a second selection signal based on a second selecting signal, and comparator means connected to receive said first and second selection signals for comparing cyclically said first selection signal with said second selection signal to produce said logical state signal based on the comparing result, said logical state signal including said first logical state signal when said first and second selecting means select said first and second electrical quantities, respectively and said second logical state signal when said first and second selecting means select said third and fourth electrical quantities, respectively; and said digital data processing means includes means for producing said first and second selecting signals so as to receive said first and second logical state signals cyclically.

7. The protective relaying system according to claim 6, wherein:

said input conversion means produces an electrical quantity $\dot{I}\dot{Z}$ which is a vector product of said first input signal $\dot{I}$ and a line impedance $\dot{Z}$ of said electric power system as said first electrical quantity, an electrical quantity $\dot{V}'$ is a product of said second input signal $\dot{V}$ and a constant k as said second electrical quantity, and an electrical quantity $\dot{W}\dot{V}_P$ which lags behind a polar voltage $\dot{V}_P$ derived from said second input signal $\dot{V}$ by an electrical angle of 90° as said third electrical quantity; and said second selecting means receives a reference voltage as said fourth electrical quantity.

8. The protective relaying system according to claim 6, wherein:

said input conversion means produces an electrical quantity $\dot{I}\dot{Z}rs$ which lags behind said first input signal $\dot{I}$ by a predetermined electrical angle as said first electrical quantity, an electrical quantity $\dot{V}'$ which is a product of said second input signal $\dot{V}$ and a constant k as said second electrical quantity, and an electrical quantity $\dot{W}\dot{I}\dot{Z}rs$ which lags behind said electrical quantity $\dot{I}\dot{Z}rs$ by an electrical angle of 90° as said third electrical quantity; and said second selecting means receives a reference voltage as said fourth electrical quantity.

9. The protective relaying system according to claim 6, wherein:

said input conversion means produces said plurality of electrical quantities further including said fourth electrical quantity;

said second selecting means receives said fourth electrical quantity from said input conversion means; and said input conversion means produces an electrical quantity $\dot{I}\dot{Z}$ which is a vector product of said first input signal $\dot{I}$ and a line impedance $\dot{Z}$ of said electric power system as said first electrical quantity, a polar voltage $\dot{V}_P$ derived from said second input signal $\dot{V}$ as said second electrical quantity, an electrical quantity $(1/k) \dot{W}\dot{I}\dot{Z}$ which is a product of a constant $(1/k)$ and an electrical quantity $\dot{W}\dot{I}\dot{Z}$ lagging behind the electrical quantity $\dot{I}\dot{Z}$ by an electrical angle of 90° as said third electrical quantity and an electrical quantity $(-\dot{W}\dot{V}_P)$ which leads said polar voltage $\dot{V}_P$ by an electrical angle of 90° as said fourth electrical quantity.

10. The protective relaying system according to claim 1, wherein:

said comparing means includes, selecting means connected to said input conversion means for receiving said first, second and third electrical quantities, for receiving said fourth electrical quantity, for selecting cyclically one of said second, first, fourth and third electrical quantities in this order to produce a selection signal based on a selecting signal, sample and hold means connected to said selecting means for receiving said selection signal and for sampling and holding said selection signal cyclically to produce a sample-held signal based on a control signal, and comparator means connected to receive said selection signal and said sample-held signal for comparing cyclically said selection signal with said sample-held signal to produce said logical state signal based on a comparison result, said logical state signal including said first logical state signal when said selecting means selects said first electrical quantity and said sample and hold means outputs said sample-held signal corresponding to said second electrical quantity and said second logical state signal when said selecting means selects said third electrical quantity and said sample and hold means outputs said sample-held signal corresponding to said fourth electrical quantity; and said digital data processing means includes means for producing said selecting signal so that said selecting means selects one of said second, first, fourth and third electrical quantity cyclically, and means for producing said control signal so as to receive said selection signal corresponding to said second and fourth electrical quantities cyclically.

11. The protective relaying system according to claim 10, wherein:

said input conversion means produces an electrical quantity $\dot{I}\dot{Z}$ which is a vector product of said first input signal $\dot{I}$ and a line impedance $\dot{Z}$ of said electric power system as said first electrical quantity, an electrical quantity $\dot{V}'$ which is a product of said second input signal $\dot{V}$ and a constant k as said second electrical quantity, an electrical quantity $\dot{W}\dot{V}_P$ which lags behind a polar voltage $\dot{V}_P$ derived from said second input signal $\dot{V}$ by an electrical angle of 90° as said third electrical quantity; and said selecting means receives a reference voltage as said fourth electrical quantity.

12. The protective relaying system according to claim 1, wherein said comparing means includes:

first comparator means connected to said input conversion means for receiving said first and second electrical quantities and for comparing cyclically said first electrical quantity with said second electrical quantity to produce said first logical state signal based on said first comparing result; and second comparator means connected to said input conversion means for receiving said third electrical quantity and for receiving said fourth electrical quantities, and for comparing cyclically said third electrical quantity with said fourth electrical quantity to produce said second logical state signal based on said second comparison result.

13. The protective relaying system according to claim 1, wherein said comparing means includes:
   summing means connected to said input conversion means for receiving said first and second electrical quantities and for summing said first electrical quantity and said second electrical quantity to produce a summed signal;
   first comparator means connected to receive said summed signal and for comparing said summed signal with a reference voltage to produce said first logical state signal based on said first comparison result; and
   second comparator means connected to said input conversion means for receiving said third electrical quantity, for receiving said fourth electrical quantity and for comparing said third electrical quantity with said fourth electrical quantity to produce said second logical state signal based on said second comparison result.

14. The protective relaying system according to claim 13, wherein:
   said input conversion means produces an electrical quantity $\dot{I}\dot{Z}$ which is a vector product of said first input signal $\dot{I}$ and a line impedance $\dot{Z}$ of said electric power system as said first electrical quantity, an electrical quantity $(-\dot{V})$ which is the inverse of a product of said second input signal $\dot{V}$ and a constant k as said second electrical quantity, and an electrical quantity $\dot{W}\dot{V}_P$ which lags behind a polar voltage $\dot{V}_P$ derived from said second input signal $\dot{V}$ by an electrical angle of 90° as said third electrical quantity; and
   said second comparator means receives a reference voltage as said fourth electrical quantity.

15. The protective relaying system according to claim 13, wherein:
   said comparing means includes, first, second and third selecting means,
   said first selecting means being connected to said input conversion means for receiving a first plurality of said electrical quantities including said first electrical quantity, and for selecting cyclically one of said first plurality of electrical quantities to produce a first selection signal based on a first selecting signal,
   said second selecting means being connected to said input conversion means for receiving a second plurality of said electrical quantities including said second electrical quantity, and for selecting cyclically one of said second plurality of electrical quantities to produce a second selection signal based on a second selecting signal, and
   said third selecting means being connected to said input conversion means for receiving a third plurality of said electrical quantities including said third electrical quantity, and for selecting cyclically one of said third plurality of electrical quantities to produce a third selection signal based on a third selecting signal;
   said comparing means further includes,
   summing means connected to said first and second selecting means for receiving said first and second selection signals and for summing said first selecting signal and said second selecting signal to produce a summed signal,
   first comparator means connected to receive said summed signal and for comparing cyclically said summed signal with a reference voltage to produce said first logical state signal based on said first comparison result,
   second comparator means connected to receive said third selecting signal, for receiving said fourth electrical quantity and for comparing cyclically said third selecting signal with said fourth electrical quantity to produce said second logical state signal based on said second comparison result; and
   said digital data processing means includes means for producing said first, second and third selecting signals so as to receive said first and second logical state signals cyclically.

16. A protective relaying system which detects a fault in an electric power system having a circuit breaker by using a current and a voltage of said electric power system and causes said circuit breaker to trip in accordance with the fault detection so as to protect said electric power system, said protective relaying system, comprising:
   input conversion means adapted for connecting said electric power system to receive a first input signal corresponding to said current and a second input signal corresponding to said voltage, for converting the magnitude and/or the phase of said first and second input signals to produce a plurality of electrical quantities including a first and a third electrical quantities, and for outputting said second input signal without conversion as a second electrical quantity;
   selecting means connected to said input conversion means for receiving said first and third electrical quantities for selecting cyclically one of said first and third electrical quantities to produce a selection signal based on a selecting signal;
   amplifying means connected to said input conversion means for receiving said second electrical quantity and for amplifying cyclically said second electrical quantity by an amplifying factor determined by a control signal to produce an amplified electrical quantity including a first and a second amplified electrical quantities;
   comparator means connected to receive said selection signal and said amplified electrical quantity for comparing cyclically said selection signal with said amplified electrical quantity to produce a logical state signal based on the comparison result, said logical state signal including a first logical state signal when said selecting means selects said first electrical quantity and said amplifying means outputs said first amplified electrical quantity and a second logical state signal when said selecting means selects said third electrical quantity and said amplifying means outputs said second amplified electrical quantity; and
   digital data processing means connected to said comparator means for receiving cyclically said logical state signal, for producing a first and a second serial logical state signals based on said cyclically received first and second logical state signals, respectively, and for judging whether a phase-rotation sequence of said first and second serial logical state signals equals a predetermined sequence to produce a protection relay output signal based on the judging result, said protection relay output signal being adapted for using to trip said circuit breaker, said digital data processing means further including means for producing said selecting signal and said control signal so as to receive said first and second logical state signals cyclically.

17. The protective relaying system according to claim 16, wherein:
said input conversion means produces an electrical quantity $k\dot{I}$ which is a product of said first input signal $\dot{I}$ and a constant K as said first electrical quantity, said second input signal $\dot{V}$ as said second electrical quantity and an electrical quantity $\dot{I}\dot{Z}_X$ which leads said input signal $\dot{I}$ by an electrical angle of 90°;
said digital data processing means produces said control signal which causes said amplifying factor to be zero at a first time and a non-zero constant at a second time cyclically, said first and second amplified electrical quantities corresponding to said amplifying factors of said zero and said non-zero constant.

18. The protective relaying system according to claim 16, wherein:
said input conversion means produces an electrical quantity $\dot{V}_P$ which is a polar voltage of said second input signal $\dot{V}$ as said first electrical quantity, said second input signal $\dot{V}$ as said second electrical quantity and an electrical quantity $\dot{I}\dot{Z}$ which is a vector product of said first input signal $\dot{I}$ and a line impedance $\dot{Z}$ of said electric power system as said third electrical quantity;
said digital data processing means produces said control signal which causes said amplifying factor to be zero at a first time and a non-zero constant (1/M) at a second time cyclically, said first and second amplified electrical quantities corresponding to said amplifying factors of said zero and said non-zero constant (1/M).

19. A protective relaying system which detects a fault in an electric power system having a circuit breaker by using a current and a voltage of said electric power system and causes said circuit breaker to trip in accordance with the fault detection so as to protect said electric power system, said protective relaying system, comprising:
input conversion means adapted for connecting said electric power system to receive a first input signal corresponding to said current and a second input signal corresponding to said voltage, for converting the magnitude and/or the phase of said first and second input signal to produce a plurality of electrical quantities including a first, a second and a third electrical quantities;
first selecting means connected to said input converting means for receiving said first electrical quantity, for receiving a fourth electrical quantity and selecting one of said first and third electrical quantities to produce a first selection signal based on a first selecting signal;
second selecting means connected to said input converting means for receiving said second electrical quantity, for receiving said fourth electrical quantity and selecting one of said second and fourth electrical quantities to produce a second selection signal based on a second selecting signal;
third selecting means connected to said input converting means for receiving said third electrical quantity, for receiving said fourth electrical quantity and selecting one of said third and fourth electrical quantities to produce a third selection signal based on a third selecting signal;
summing means connected to receive said first and second selection signals for summing said first selection signal and said second selection signal to produce a summed signal;
comparator means connected to receive said summed signal and said third selection signal for comparing said summed signal with said third selection signal to produce a logical state signal based on the comparison result;
each of said first, second and third selection signals and said summed signal including three values, respectively,
said logical state signal including a first, a second and a third logical state signals corresponding to said three values of each of said third selection signal and said summed signal; and
digital data processing means connected to said comparator means for receiving cyclically said logical state signal, for producing a first, a second and a third serial logical state signals based on said cyclically received first, second and third logical state signals, respectively, and for judging whether a phase-rotation sequence of said first, second and third serial logical state signals equals a predetermined sequence to produce a protection relay output signal based on the judging result, said protection relay output signal being adapted for using to trip said circuit breaker,
said digital data processing means further including means for producing said first, second and third selection signal so as to receive said first, second and third logical state signal cyclically.

20. The protective relaying system according to claim 19, wherein:
said input conversion means produces an electrical quantity $\dot{I}r$ which is a product of said input signal $\dot{I}$ and a constant as said first electrical quantity, an electrical quantity $\dot{I}_Z$ leading an electrical quantity which is made by reducing the magnitude of said first input signal $\dot{I}$ by an impedance angle of said electric power system as said second electrical quantity, and an electrical quantity $\dot{V}'$ which is a product of said second input signal $\dot{V}$ and a constant.

* * * * *